US011463030B2

(12) United States Patent
Jordan et al.

(10) Patent No.: US 11,463,030 B2
(45) Date of Patent: Oct. 4, 2022

(54) SYSTEMS AND METHODS FOR CALCULATING MOTOR POSITION, INERTIA AND REST POSITION IN SENSORLESS BRUSHED DC MOTOR CONTROL SYSTEMS, AND FOR DETERMINING SEAT OCCUPANT WEIGHT BASED ON MOTOR CURRENT

(71) Applicant: Gentherm Inc., Northville, MI (US)

(72) Inventors: Patrick Jordan, Austin, TX (US); Dusko Petrovski, Rochester, MI (US)

(73) Assignee: Gentherm Inc., Northville, MI (US)

( * ) Notice: Subject to any disclaimer, the term of this patent is extended or adjusted under 35 U.S.C. 154(b) by 57 days.

(21) Appl. No.: 17/174,626

(22) Filed: Feb. 12, 2021

(65) Prior Publication Data

US 2021/0167704 A1 Jun. 3, 2021

Related U.S. Application Data

(63) Continuation of application No. 16/713,573, filed on Dec. 13, 2019, now Pat. No. 11,070,151, which is a (Continued)

(51) Int. Cl.
*H02P 6/10* (2006.01)
*H02P 6/24* (2006.01)
(Continued)

(52) U.S. Cl.
CPC .............. *H02P 6/24* (2013.01); *B60N 2/0232* (2013.01); *B60N 2/0248* (2013.01); *B60N 2/12* (2013.01);
(Continued)

(58) Field of Classification Search
CPC . H02P 6/24; H02P 6/18; H02P 7/0094; B60N 2/0232; B60N 2/0248; B60N 2/12; B60N 2/16
See application file for complete search history.

(56) References Cited

U.S. PATENT DOCUMENTS 5,513,058 A 4/1996 Hollenbeck
10,536,100 B2 1/2020 Jordan et al.
(Continued)

FOREIGN PATENT DOCUMENTS

CN 104553911 A 4/2015
JP H08-168291 A 6/1996
(Continued)

OTHER PUBLICATIONS

Machine Translation of Search Report corresponding to Japanese Patent Application No. 2017-074059 dated Nov. 17, 2020, 20 pages.
(Continued)

*Primary Examiner* — Cortez M Cook

(57) ABSTRACT

A system includes a motor control module and an occupant weight classification module. The motor control module is configured to supply power to a motor to move a seat in a first direction from a first position to a second position when the seat is unoccupied and supply power to the motor to move the seat in a second direction from a third position to a fourth position when an occupant is in the seat. The occupant weight classification module is configured to measure a first frequency of ripples in current supplied to the motor as the seat is moved from the first position to the second position, measure a second frequency of ripples in the current supplied to the motor as the seat is moved from the third position to the fourth position, and determine a weight of the occupant based on the first and second frequencies.

20 Claims, 20 Drawing Sheets

10
14
12
16
16

Related U.S. Application Data continuation of application No. 15/474,580, filed on Mar. 30, 2017, now Pat. No. 10,536,100.

(60) Provisional application No. 62/317,048, filed on Apr. 1, 2016.

(51) Int. Cl.

| | |
|---|---|
| ***B60N 2/02*** | (2006.01) |
| ***B60N 2/12*** | (2006.01) |
| ***B60N 2/16*** | (2006.01) |
| ***H02P 6/18*** | (2016.01) |
| ***H02P 7/00*** | (2016.01) |

(52) U.S. Cl.

CPC .................. *B60N 2/16* (2013.01); *H02P 6/18* (2013.01); *H02P 7/0094* (2013.01)

(56) References Cited

U.S. PATENT DOCUMENTS

| | | | |
|---|---|---|---|
| 2001/0020834 | A1 | 9/2001 | Berkowitz et al. |
| 2002/0008483 | A1 | 1/2002 | Kaeufl et al. |
| 2002/0024308 | A1 | 2/2002 | Kato et al. |
| 2003/0102831 | A1 | 6/2003 | Lutter et al. |
| 2004/0150362 | A1 | 8/2004 | Simmons et al. |
| 2004/0174124 | A1 | 9/2004 | Lee |
| 2005/0258796 | A1 | 11/2005 | Kusaka |
| 2007/0194736 | A1 | 8/2007 | Pino et al. |
| 2008/0079380 | A1 | 4/2008 | Knittel et al. |
| 2010/0083579 | A1 | 4/2010 | Kigoshi |
| 2012/0235612 | A1* | 9/2012 | Akashi ...................... H02P 6/10 318/400.23 |
| 2014/0001815 | A1 | 1/2014 | Tanaka et al. |
| 2020/0119670 | A1 | 4/2020 | Jordan et al. |

FOREIGN PATENT DOCUMENTS

| | | | |
|---|---|---|---|
| JP | 2000-250629 | A | 9/2000 |
| JP | 2005-261134 | A | 9/2005 |
| JP | 2012-146053 | A | 8/2012 |
| JP | 2012-205377 | A | 10/2012 |
| JP | 2014-007804 | A | 1/2014 |
| JP | 2014-061735 | A | 4/2014 |
| JP | 2016-002902 | A | 1/2016 |
| JP | 2017-007804 | A | 1/2017 |
| KR | 2014-0137419 | A | 12/2014 |
| WO | WO-2013132248 | A1 | 9/2013 |

OTHER PUBLICATIONS

Translation of Notice of Reasons for Refusal dated Jan. 5, 2021 corresponding to Japanese Patent Application No. 2017-074059, 7 pages.

Translation of Office Action dated Jun. 21, 2021 corresponding to Korean Patent Application No. 10-2017-0041936, 27 pages.

* cited by examiner

FIG. 3A
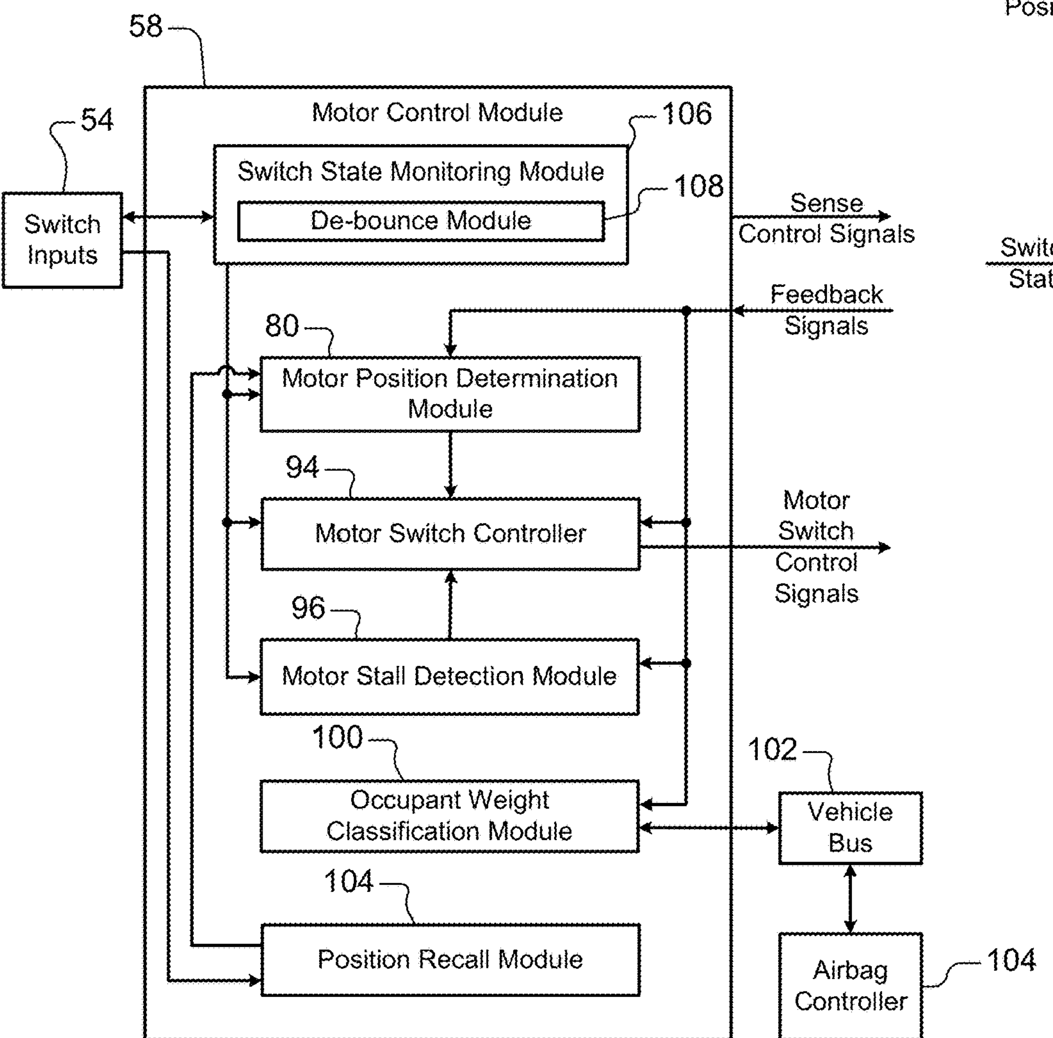
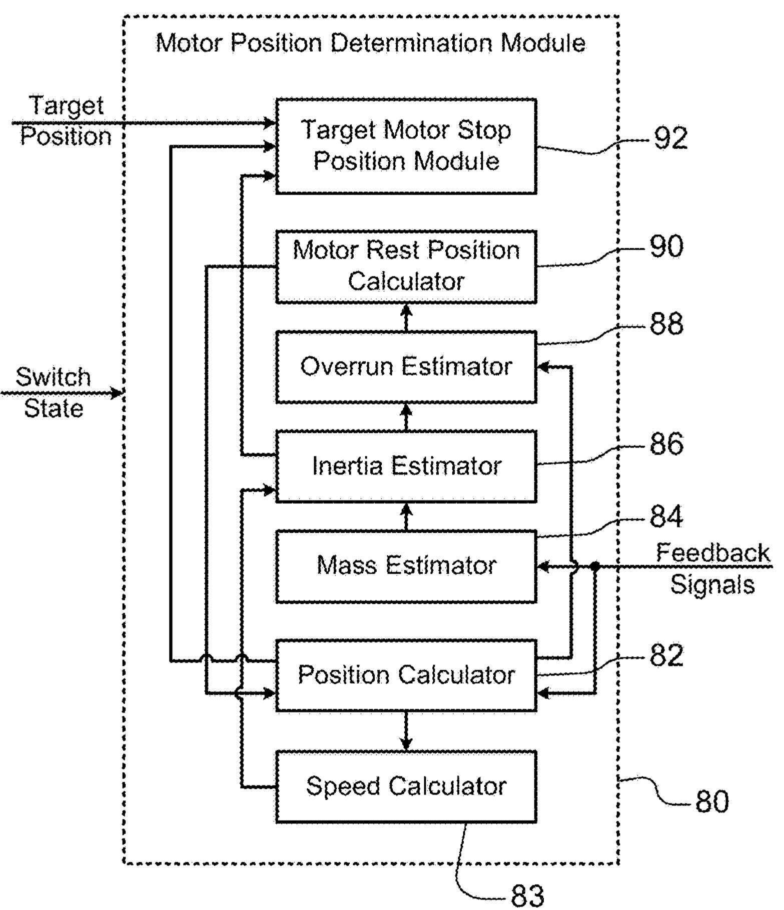
FIG. 3B

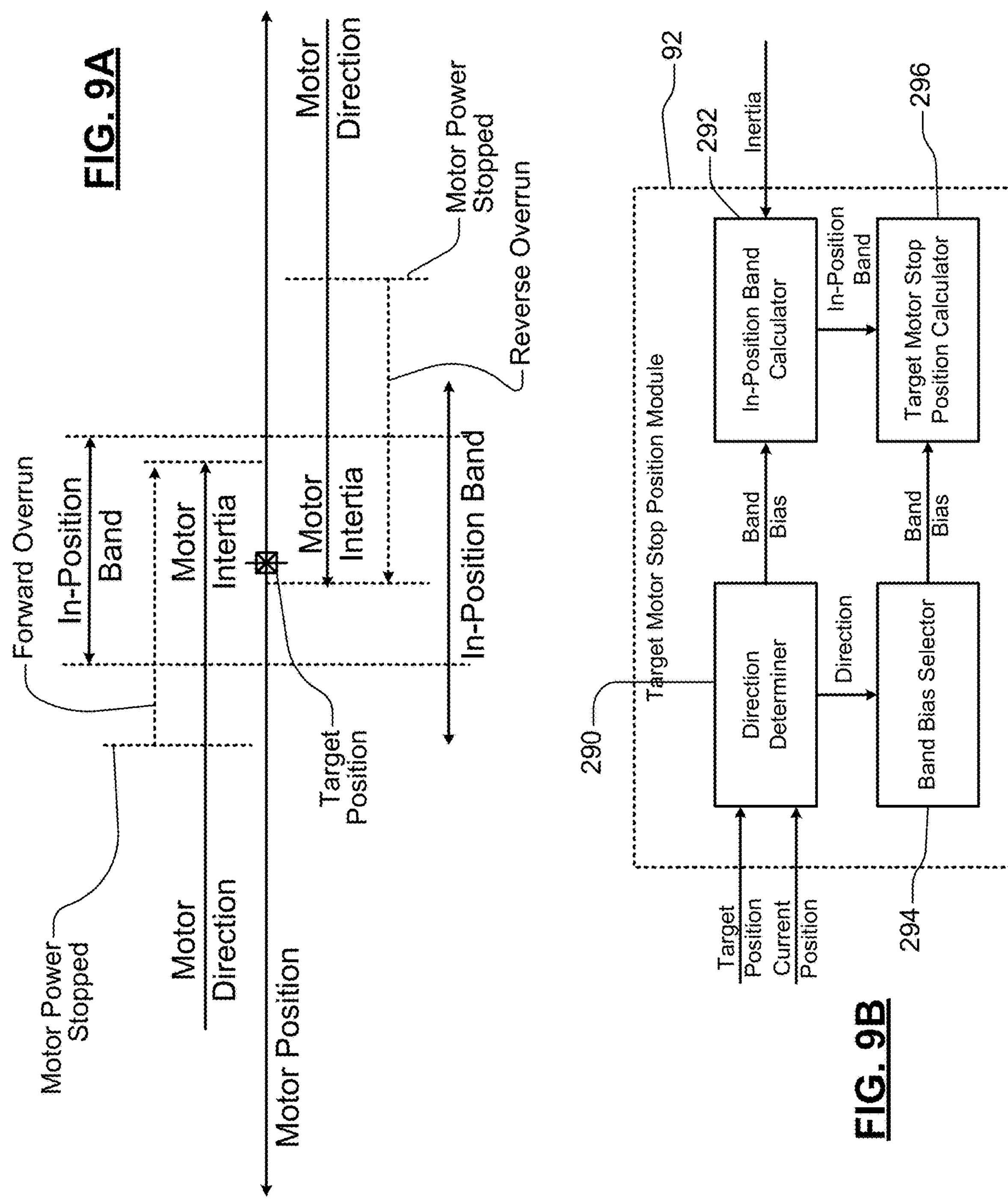
FIG. 9A
Motor Direction
Motor Power Stopped
Reverse Overrun
Forward Overrun
In-Position Band
Motor Intertia
Motor Intertia
In-Position Band
Target Position
Motor Power Stopped
Motor Direction
Motor Position
92
292
Inertia
296
In-Position Band
In-Position Band Calculator
Target Motor Stop Position Calculator
Target Motor Stop Position Module
Band Bias
Band Bias
Direction
290
Direction Determiner
Band Bias Selector
Target Position
Current Position
294
FIG. 9B

SYSTEMS AND METHODS FOR CALCULATING MOTOR POSITION, INERTIA AND REST POSITION IN SENSORLESS BRUSHED DC MOTOR CONTROL SYSTEMS, AND FOR DETERMINING SEAT OCCUPANT WEIGHT BASED ON MOTOR CURRENT

CROSS-REFERENCE TO RELATED APPLICATIONS

The present disclosure is a continuation of U.S. patent application Ser. No. 16/713,573, filed on Dec. 13, 2019, which is a divisional of U.S. patent application Ser. No. 15/474,580 (now U.S. Pat. No. 10,536,100), filed on Mar. 30, 2017, which claims the benefit of U.S. Provisional Application No. 62/317,048, filed on Apr. 1, 2016. The entire disclosures of the applications referenced above are incorporated herein by reference.

FIELD

The present disclosure relates to motor control systems, and more particularly to systems and methods for calculating motor position, inertia and rest position in sensorless brushed DC motor control systems, and for determining seat occupant weight based on motor current.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Brushed DC motors have been used to adjust a position of seats, mirrors or other components in automotive, aeronautical or other applications. For example, seat motors are used to move a seat assembly forward, backward, up and down. Seat motors are also used to adjust an angular position or tilt of a backrest portion relative to a seat portion of the seat assembly.

Some seat positioning systems store seat positions for drivers and/or passengers of the vehicle. Each of the stored seat positions may be associated with a recall button located on the seat assembly, door or other location. Alternately, a seat position may be associated with a key FOB. When one of the recall buttons is pressed or the key FOB is in the vicinity of the vehicle, the seat assembly automatically moves the seat assembly to the corresponding stored seat position. In order to reposition the seat assembly to the correct position, the seat positioning system needs to know a current position and a target position of each of the motors associated with the seat assembly.

In some applications, Hall Effect sensors are used to sense the positions of the motors. However, each of the motors needs to have a corresponding Hall Effect sensor and wiring. Some seat assemblies can have up to 14 motors. Therefore, the Hall Effect sensors and wiring may represent a relatively expensive component of the seat assembly.

SUMMARY

A first system according to the present disclosure includes a motor driver module and a motor position determination module. The motor driver module is configured to measure current supplied to a motor. The motor position determination module is configured to determine a first position of the motor at a first time when power supply to the motor is initially discontinued based on ripples in the current supplied to the motor during a first period before the first time. The motor position determination module is configured to determine a second position of the motor at a second time when the motor stops rotating after power supply to the motor is discontinued based on the first position of the motor and a rotational speed of the motor at the first time.

In one aspect, the motor position determination module is configured to determine the second position of the motor based on the first position of the motor and a distance by which the motor rotates during a second period between the first and second times.

In one aspect, the motor position determination module is configured to determine the rotational distance of the motor during the second period based on a rotational speed of the motor during the second period and a duration of the second period.

In one aspect, the motor position determination module is configured to determine the rotational speed of the motor during the second period based on the rotational speed of the motor at the first time and a decay factor.

In one aspect, the motor position determination module is configured to determine the decay factor based on a first voltage supplied to the motor at the first time.

In one aspect, the motor position determination module is configured to determine the decay factor based on a difference between a frequency of the ripples in the current supplied to the motor measured during the first period, the first voltage supplied to the motor at the first time, and a reference ripple frequency of the motor corresponding to the first voltage.

In one aspect, the motor position determination module is configured to predict the second position of the motor at a third time based on the first position of the motor and the rotational speed of the motor at the first time when power supply to the motor is initially discontinued. The third time is earlier than the second time when the motor stops rotating.

In one aspect, the third time is equal to the first time.

In one aspect, the first system further includes a target motor stop position module configured to determine when to discontinue power supply to the motor based on the second position and a target position.

In one aspect, the first system further includes a motor control module configured to discontinue power supply to the motor when the second position is one of equal to the target position and within a predetermined range of the target position.

A second system according to the present disclosure includes a motor driver module and a motor position determination module. The motor driver module is configured to measure current supplied to a motor and measure current induced by the motor after power supply to the motor is discontinued. The motor position determination module is configured to determine a position of the motor when power is supplied to the motor based on ripples in the current supplied to the motor. The motor position determination module is configured to determine the position of the motor after power supply to the motor is discontinued based on ripples in the current induced by the motor.

In one aspect, the motor position determination module is configured to determine a first position of the motor at a first time when power supply to the motor is initially discontinued based on the ripples in the current supplied to the motor during a first period before the first time.

In one aspect, the motor position determination module is configured to determine a second position of the motor at a second time after power supply to the motor is discontinued based on the ripples in the current induced by the motor during a second period between the first and second times.

In one aspect, the motor position determination module is configured to determine the second position of the motor at the second time based on the first positon of the motor at the first time and the ripples in the current induced by the motor during the second period.

In one aspect, the motor position determination module is configured to determine a distance by which the motor rotates during the second period, and determine the second position of the motor at the second time based on the first position of the motor at the first time and the rotational distance of the motor during the second period.

In one aspect, the motor position determination module is configured to determine the rotational distance of the motor during the second period based on a rotational speed of the motor during the second period and a duration of the second period.

In one aspect, the motor position determination module is configured to determine the rotational speed of the motor during the second period based on a frequency of the ripples in the current induced by the motor during the second period.

In one aspect, the motor position determination module is configured to determine the position of the motor after power supply to the motor is discontinued based on a number of the ripples in the current induced by the motor.

In one aspect, the second system further includes a motor control module configured to rotate the motor in a first rotational direction by closing a first switch to allow current to flow through the motor in a first flow direction, and rotate the motor in a second rotational direction by closing a second switch to allow current to flow the motor in a second flow direction.

In one aspect, the second system further includes a first motor driver module configured to control a first amount of current flowing in the first flow direction, and a second motor driver module configured to control a second amount of current flowing in the second flow direction. The motor control module is configured to control the first and second switches to circulate current through both the first and second motor driver modules when the motor continues to rotate in either one of the first and second rotational directions after power supply to the motor is discontinued. At least one of the first and second motor driver modules is configured to measure the current induced by the motor.

A third system according to the principles of the present disclosure includes a motor control module, a motor position determination module, and a target motor stop position module. The motor control module is configured to supply power to a motor of a seat assembly to rotate the motor from a current position to a target position. The motor position determination module is configured to determine a rotational speed of the motor based on ripples in current supplied to the motor, and determine an inertia of the seat assembly based on the rotational speed of the motor and a mass of the seat assembly. The target motor stop position module is configured to determine when to discontinue power supply to the motor based on the target position of the motor and the inertia of the seat assembly.

In one aspect, the target motor stop position module is configured to determine when to discontinue power supply to the motor based on a direction in which the motor is rotating.

In one aspect, the target motor stop position module is configured to determine an in-position band around the target position based on the inertia of the seat assembly and the direction in which the motor is rotating, and the motor control module is configured to discontinue power supply to the motor at one of a first time before the current position of the motor is within the in-position band and a second time when the current position of the motor is initially within the in-position band.

In one aspect, the target motor stop position module is configured to determine the in-position band at fixed intervals, and a first period between the intervals is greater than a second period between successive ones of the ripples in the current supplied to the motor.

In one aspect, the target motor stop position module is configured to determine an in-position band width based on the inertia of the seat assembly, determine a band bias based on the direction in which the motor is rotating, and determine a target motor stop position based on the in-position band width and the band bias. The motor control module is configured to discontinue power supply to the motor when the current position of the motor reaches the target motor stop position.

In one aspect, the motor control module is configured to supply power to the motor for a first period that is greater than or equal to a minimum motor on-time.

In one aspect, the motor control module is configured to determine the minimum motor on-time based on at least one of an amplitude of the current supplied to the motor and a number of the ripples in the current supplied to the motor.

In one aspect, the motor control module is configured to discontinue power supply to the motor at a first time when the motor is in a first position. The motor position determination module is configured to determine a second position of the motor at a second time when the motor stops rotating after power supply to the motor is discontinued based on the first position of the motor at the first time and the inertia of the seat assembly at the first time.

In one aspect, the motor position determination module is configured to predict the second position of the motor at a third time based on the first position of the motor at the first time and the inertia of the seat assembly at the first time. The third time is earlier than the second time when the motor stops rotating.

In one aspect, the motor position determination module is configured to determine the inertia of the seat assembly at the first time based on a difference between a frequency of the ripples in the current supplied to the motor measured during a first period before the first time, a first voltage supplied to the motor at the first time, and a reference ripple frequency of the motor corresponding to the first voltage.

In one aspect, the third system further includes a motor stall detection module configured to determine when the motor stalls based on at least one of the rotational speed of the motor, a position of the motor, a voltage supplied to the motor, and a number of the ripples in the current supplied to the motor. The motor control module is configured to discontinue power supply to the motor when the motor stalls.

A fourth system according to the present disclosure includes a motor control module and an occupant weight classification module. The motor control module is configured to supply power to a motor to move a seat in a first direction from a first position to a second position when the seat is unoccupied, and to supply power to the motor to move the seat in a second direction from a third position to a fourth position when an occupant is in the seat. The occupant weight classification module is configured to measure a first frequency of ripples in current supplied to the motor as the seat is moved from the first position to the second position, measure a second frequency of ripples in the current supplied to the motor as the seat is moved from the third position to the fourth position, and determine a weight of the occupant based on the first and second frequencies.

In one aspect, a first distance between the first and second positions is equal to a second distance between the third and fourth positions.

In one aspect, the second direction is the same as the first direction.

In one aspect, the third position is the same as the first position, and the fourth position is the same as the second position.

In one aspect, the third position is the same as the second position, and the fourth position is the same as the first position.

In one aspect, the occupant weight classification module is configured to determining whether the seat is occupied based on an input from at least one of a seat belt latch sensor, a door latch sensor, and a camera operable to generate an image of the seat.

A fifth system according to the present disclosure includes a motor control module and an occupant weight classification module. The motor control module is configured to supply power to a motor to move a seat in a first direction for a first period when the seat is unloaded, and supply power to a motor to move a seat in a second direction for a second period when an occupant is in the seat. The occupant weight classification module is configured to measure a first number of ripples in current supplied to the motor during the first period, measure a second number of ripples in the current supplied to the motor during the second period, and determine a weight of the occupant based on the first number of ripples and the second number of ripples.

In one aspect, the second period is equal to the first period.

In one aspect, the second direction is the same as the first direction.

In one aspect, the occupant weight classification module is configured to determine whether the seat is occupied based on an input from at least one of a seat belt latch sensor, a door latch sensor, and a camera operable to generate an image of the seat.

A first method according to the present disclosure includes measuring current supplied to a motor and determining a first position of the motor at a first time when power supply to the motor is initially discontinued based on ripples in the current supplied to the motor during a first period before the first time. The method further includes determining a second position of the motor at a second time when the motor stops rotating after power supply to the motor is discontinued based on the first position of the motor and a rotational speed of the motor at the first time.

In one aspect, the first method further includes determining the second position of the motor based on the first position of the motor and a distance by which the motor rotates during a second period between the first and second times.

In one aspect, the first method further includes determining the rotational distance of the motor during the second period based on a rotational speed of the motor during the second period and a duration of the second period.

In one aspect, the first method further includes determining the rotational speed of the motor during the second period based on the rotational speed of the motor at the first time and a decay factor.

In one aspect, the first method further includes determining the decay factor based on a first voltage supplied to the motor at the first time.

In one aspect, the first method further includes determining the decay factor based on a difference between a frequency of the ripples in the current supplied to the motor measured during the first period, the first voltage supplied to the motor at the first time, and a reference ripple frequency of the motor corresponding to the first voltage.

In one aspect, the first method further includes predicting the second position of the motor at a third time based on the first position of the motor and the rotational speed of the motor at the first time when power supply to the motor is initially discontinued. The third time is earlier than the second time when the motor stops rotating.

In one aspect, the third time is equal to the first time.

In one aspect, the first method further includes determining when to discontinue power supply to the motor based on the second position and a target position.

In one aspect, the first method further includes discontinuing power supply to the motor when the second position is one of equal to the target position and within a predetermined range of the target position.

A second method according to the present disclosure includes measuring current supplied to a motor, determining a position of the motor when power is supplied to the motor based on ripples in the current supplied to the motor, measuring current induced by the motor after power supply to the motor is discontinued, and determining the position of the motor after power supply to the motor is discontinued based on ripples in the current induced by the motor.

In one aspect, the second method further includes determining a first position of the motor at a first time when power supply to the motor is initially discontinued based on the ripples in the current supplied to the motor during a first period before the first time.

In one aspect, the second method further includes determining a second position of the motor at a second time after power supply to the motor is discontinued based on the ripples in the current induced by the motor during a second period between the first and second times.

In one aspect, the second method further includes determining the second position of the motor at the second time based on the first positon of the motor at the first time and the ripples in the current induced by the motor during the second period.

In one aspect, the second method further includes determining a distance by which the motor rotates during the second period, and determining the second position of the motor at the second time based on the first position of the motor at the first time and the rotational distance of the motor during the second period.

In one aspect, the second method further includes determining the rotational distance of the motor during the second period based on a rotational speed of the motor during the second period and a duration of the second period.

In one aspect, the second method further includes determining the rotational speed of the motor during the second period based on a frequency of the ripples in the current induced by the motor during the second period.

In one aspect, the second method further includes determining the position of the motor after power supply to the motor is discontinued based on a number of the ripples in the current induced by the motor.

In one aspect, the second method further includes rotating the motor in a first rotational direction by closing a first switch to allow current to flow through the motor in a first flow direction, and rotating the motor in a second rotational direction by closing a second switch to allow current to flow the motor in a second flow direction.

In one aspect, the second method further includes controlling a first amount of current flowing in the first flow direction using a first motor driver module and controlling a second amount of current flowing in the second flow direction using a second motor driver module, controlling the first and second switches to circulate current through both the first and second motor driver modules when the motor continues to rotate in either one of the first and second rotational directions after power supply to the motor is discontinued, and measuring the current induced by the motor using at least one of the first and second motor driver modules.

A third method according to the present disclosure includes supplying power to a motor of a seat assembly to rotate the motor from a current position to a target position, determining a rotational speed of the motor based on ripples in current supplied to the motor, determining an inertia of the seat assembly based on the rotational speed of the motor and a mass of the seat assembly, and determining when to discontinue power supply to the motor based on the target position of the motor and the inertia of the seat assembly.

In one aspect, the third method further includes determining when to discontinue power supply to the motor based on a direction in which the motor is rotating.

In one aspect, the third method further includes determining an in-position band around the target position based on the inertia of the seat assembly and the direction in which the motor is rotating, and discontinuing power supply to the motor at one of a first time before the current position of the motor is within the in-position band and a second time when the current position of the motor is initially within the in-position band.

In one aspect, the third method further includes determining the in-position band at fixed intervals. A first period between the intervals is greater than a second period between successive ones of the ripples in the current supplied to the motor.

In one aspect, the third method further includes determining an in-position band width based on the inertia of the seat assembly, determining a band bias based on the direction in which the motor is rotating, determining a target motor stop position based on the in-position band width and the band bias, and discontinuing power supply to the motor when the current position of the motor reaches the target motor stop position.

In one aspect, the third method further includes supplying power to the motor for a first period that is greater than or equal to a minimum motor on-time.

In one aspect, the third method further includes determining the minimum motor on-time based on at least one of an amplitude of the current supplied to the motor and a number of the ripples in the current supplied to the motor.

In one aspect, the third method further includes discontinuing power supply to the motor at a first time when the motor is in a first position, and determining a second position of the motor at a second time when the motor stops rotating after power supply to the motor is discontinued based on the first position of the motor at the first time and the inertia of the seat assembly at the first time.

In one aspect, the third method further includes predicting the second position of the motor at a third time based on the first position of the motor at the first time and the inertia of the seat assembly at the first time. The third time is earlier than the second time when the motor stops rotating.

In one aspect, the third method further includes determining the inertia of the seat assembly at the first time based on a difference between a frequency of the ripples in the current supplied to the motor measured during a first period before the first time, a first voltage supplied to the motor at the first time, and a reference ripple frequency of the motor corresponding to the first voltage.

In one aspect, the third method further includes determining when the motor stalls based on at least one of the rotational speed of the motor, a position of the motor, a voltage supplied to the motor, and a number of the ripples in the current supplied to the motor, and discontinuing power supply to the motor when the motor stalls.

A fourth method according to the present disclosure includes supplying power to a motor to move a seat in a first direction from a first position to a second position when the seat is unoccupied, and measuring a first frequency of ripples in current supplied to the motor as the seat is moved from the first position to the second position. The fourth method further includes supplying power to the motor to move the seat in a second direction from a third position to a fourth position when an occupant is in the seat, and measuring a second frequency of ripples in the current supplied to the motor as the seat is moved from the third position to the fourth position. The fourth method further includes determining a weight of the occupant based on the first and second frequencies.

In one aspect, a first distance between the first and second positions is equal to a second distance between the third and fourth positions.

In one aspect, the second direction is the same as the first direction.

In one aspect, the third position is the same as the first position, and the fourth position is the same as the second position.

In one aspect, the third position is the same as the second position, and the fourth position is the same as the first position.

In one aspect, the fourth method further includes determining whether the seat is occupied based on an input from at least one of a seat belt latch sensor, a door latch sensor, and a camera operable to generate an image of the seat.

A fifth method according to the present disclosure includes supplying power to a motor to move a seat in a first direction for a first period when the seat is unloaded, and measuring a first number of ripples in current supplied to the motor during the first period. The fifth method further includes supplying power to a motor to move a seat in a second direction for a second period when an occupant is in the seat, and measuring a second number of ripples in the current supplied to the motor during the second period. The fifth method further includes determining a weight of the occupant based on the first number of ripples and the second number of ripples.

In one aspect, the second period is equal to the first period.

In one aspect, the second direction is the same as the first direction.

In one aspect, the fifth method further includes determining whether the seat is occupied based on an input from at least one of a seat belt latch sensor, a door latch sensor, and a camera operable to generate an image of the seat.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 3A and 3B are functional block diagrams of an example of a seat control module and motor position determination module, respectively, according to the present disclosure;

FIG. 9A illustrates an example of an in-position band according to the present disclosure;

FIG. 9B is a functional block diagram of an example of a target motor stop position module according to the present disclosure;

In the drawings, reference numbers may be reused to identify similar and/or identical elements.

DETAILED DESCRIPTION

Hall Effect sensors can be used to detect an absolute position of a motor during operation. In sensorless systems, the position of the motor may be tracked by sensing and counting ripples in the motor current, which correspond to commutation of the motor. However, the ripple current generally cannot be monitored when the motor is switched off and continues to move due to inertia. In addition, errors may occur when the motor switch is triggered for very short intervals.

To have an accurate system, the sensorless system needs to estimate the motor position during all conditions. Otherwise, the sensed position of the motor will be incorrect and seat recall functions will not work properly. In other words, the actual motor position may vary from the estimated motor position.

Systems and methods according to the present disclosure estimate a position of a motor between end stop positions during operation of the motor without using sensors such as Hall Effect sensors. The systems and methods estimate inertia of the motor based on operating voltage and current when power to the motor is discontinued and/or during a period before power to the motor is discontinued. The systems and methods according to the present disclosure estimate a resting position of the motor based on the rotational position of the motor when power is discontinued and the estimated inertia. By determining the resting position in the foregoing manner, the systems and methods described herein estimate additional rotation of the motor (or overrun) after power is discontinued. Using this approach provides a more accurate determination of the actual resting position of the motor. The estimated overrun is also used to determine when to stop power for a target stop position such as a stored seat position.

While the foregoing disclosure describes systems and methods for controlling motors in seat applications, it can be appreciated that the disclosure also relates to control of brushless DC motors used in other applications.

Figure 1:
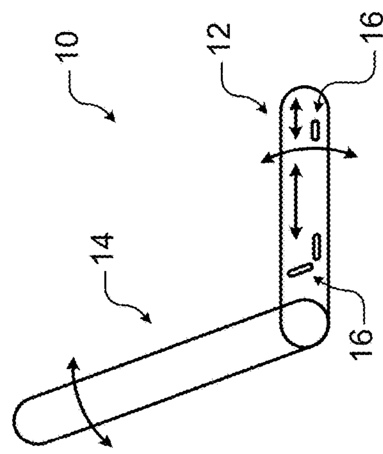
FIG. 1 is a side view of an example of a seat assembly according to the present disclosure.

Referring now to FIG. 1, a seat assembly 10 includes a seat portion 12 that is arranged in a generally horizontal position. A backrest portion 14 is arranged in a generally vertical position and pivots relative to the seat portion 12. One or more buttons 16 or other input devices may be provided to control seat motors that adjust the relative positions of the seat assembly 10, the seat portion 12 and/or the backrest portion 14. For example, the buttons 16 may be used to control up and down, forward and back and tilting movement of the seat assembly. The buttons 16 may also perform memory storing and recall functions to store seat positions and automatically move the seat assembly to the stored seat positions. Positions of the motors are estimated in a sensorless manner without the use of physical position sensors such as Hall Effect sensors and associated wiring.

Figure 2:
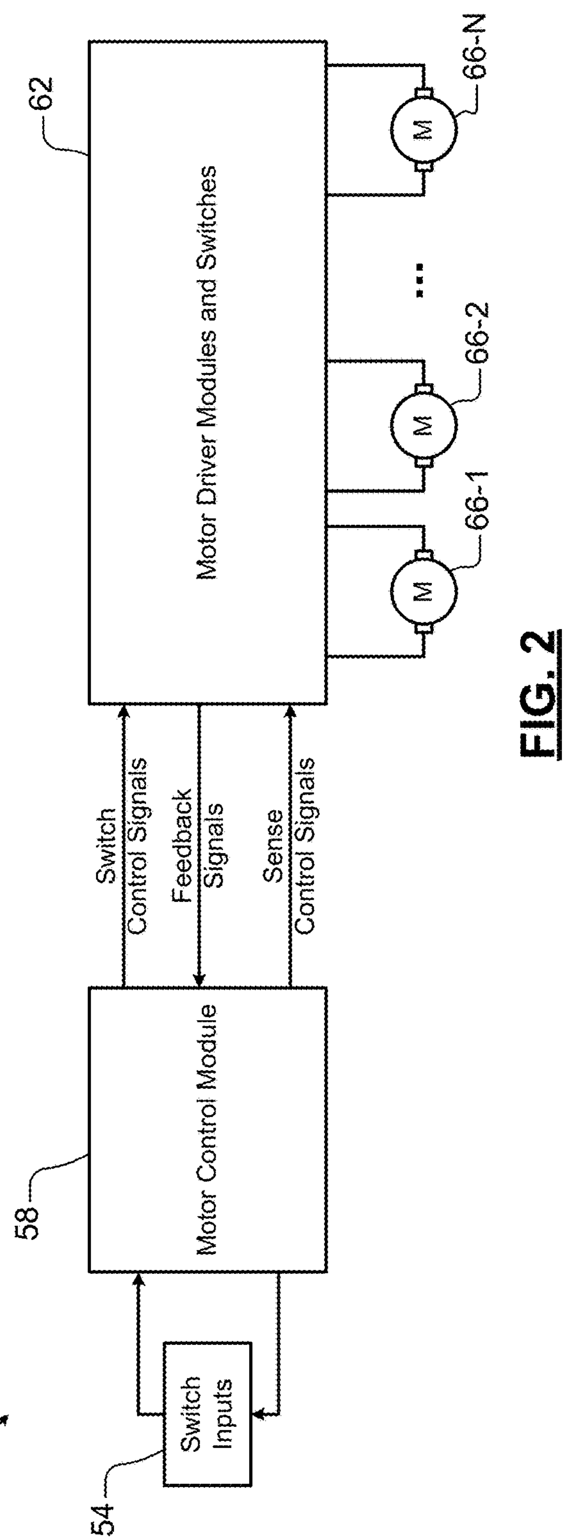
FIG. 2 is a functional block diagram of an example of a seat positioning system according to the present disclosure.

Referring now to FIG. 2, a seat positioning system 50 includes one or more switch inputs 54 that are actuated by an occupant of the vehicle to adjust the seat assembly 10, the seat portion 12 and/or the backrest portion 14. The seat positioning system 50 further includes a motor control module 58 that generates motor switch control signals and sense control signals. The motor control module 58 receives feedback signals such as DC voltage and current from motor driver modules and switches 62. The motor driver modules and switches 62 are used to control one or more motors 66-1, 66-2, . . . , and 66-N (collectively motors 66), where N is an integer greater than zero. In some examples, the motors 66 are brushed DC motors.

Referring now to FIGS. 3A and 3B, the motor control module 58 is shown in further detail. The motor control module 58 includes a motor position determination module 80 and a motor switch controller 94. The motor position determination module 80 determines positions of the motors 66 based on feedback signals such as the motor current and DC voltage.

The motor position determination module 80 includes a position calculator 82 that receives the feedback signals from a HS drive of the motors. The position calculator 82 calculates positions of the motors 66 based on prior stored positions and rotation of the motor (as determined based on the feedback signals such as current ripple). A motor speed calculator 83 receives position data from the position calculator 82 and calculates speeds of the motors 66 based on differences in position as a function of time or based on the frequency of the ripples. A mass estimator 84 receives the feedback signals from the motors 66 and calculates a mass of the seat assembly and/or occupant based on the DC voltage, current, position and/or speed.

An inertia estimator 86 receives speed parameters from the speed calculator 81 and the mass from the mass estimator 84. The inertia estimator 86 estimates system inertia based on the speed and mass data. The motor position determination module 80 further includes an overrun estimator 88 that estimates motor overrun after power is discontinued based on inertia and mass. The motor position determination module 80 further includes a motor rest position calculator 90 and a target motor stop position calculator 92 as will be described further below.

The motor position determination module 80 generates position data that is output to the motor switch controller 94, which controls the supply of current to the motors 66 using motor switches. A motor stall detection module 96 detects motor stalling, which may be due to the motor unexpectedly reaching an end stop position due to motor position errors. An occupant weight classification module 100 receives the feedback signals from the motors and estimates a weight of the occupant based thereon. The occupant weight classification module 100 selectively outputs the occupant weight and/or weight classification parameters (e.g., parameters associated with differentiated weight ranges) via the vehicle bus 102 to an airbag controller 104. The occupant weight classification module 100 may use height adjusting motors when making this calculation as opposed to fore/aft motors, as will be described further below. A position recall module 104 stores and associates seat positions with memory recall buttons. When a recall button is actuated, the position recall module 104 outputs a target seat position corresponding to the actuated memory recall button.

A switch state monitoring module 106 monitors states of the switch inputs 54 and provides filtered switch states to other components of the motor control module 58. The switch state monitoring module 106 may include a switch de-bounce module 108 that performs a switch de-bounce method as will be described further below. Switch bounce occurs when a switch changes states quickly before steady state switch conditions occur, which can lead to position errors and other problems.

Figure 4:
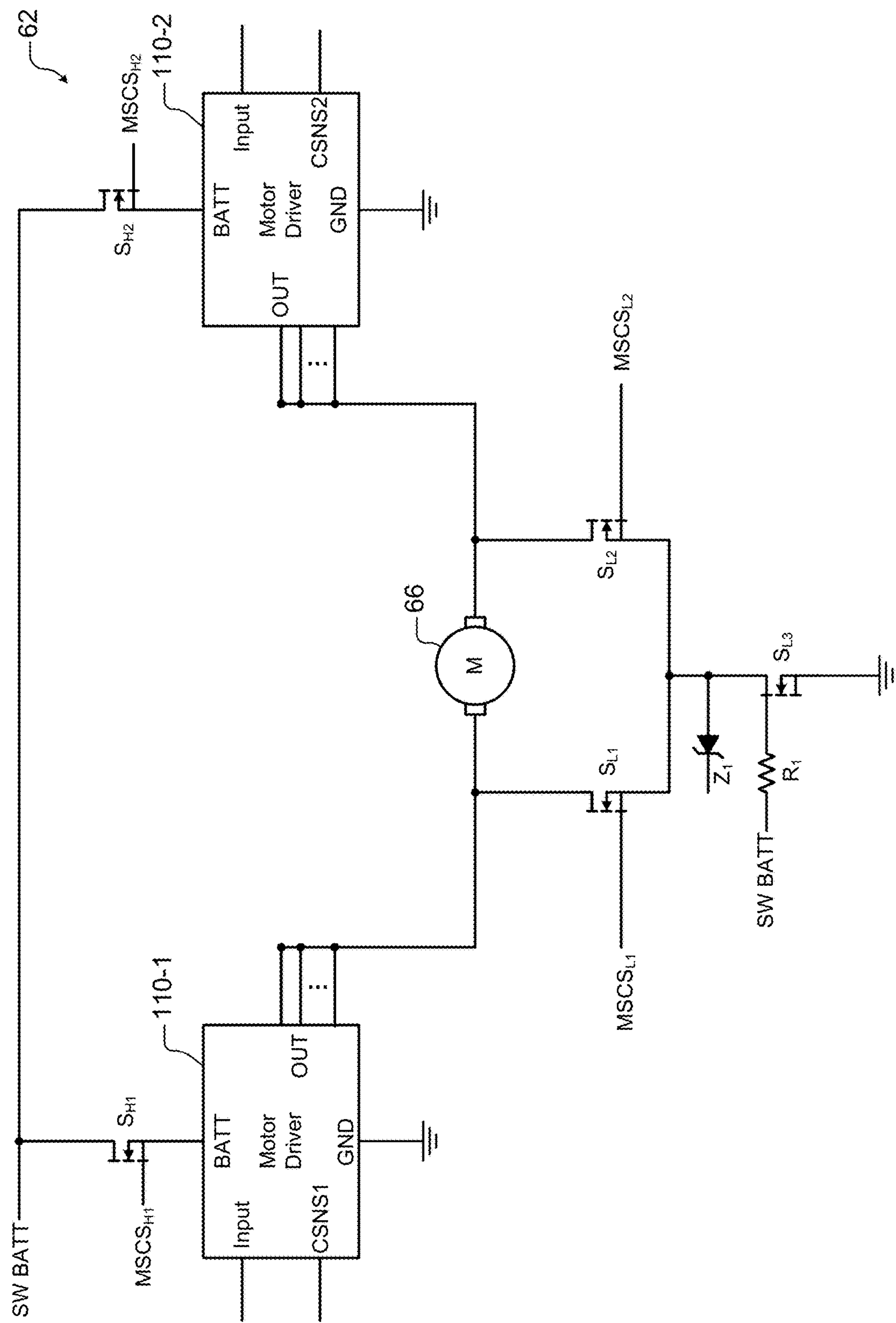
FIG. 4 is a functional block diagram and electrical schematic of an example of a motor, motor driver modules, and motor switches according to the present disclosure.

Referring now to FIG. 4, the motor driver modules and switches 62 are shown in further detail to include motor driver modules 110-1 and 110-2, high side (HS) switches $S_{H1}$ an $S_{H2}$, and low side (LS) switches $S_{L1}$, $S_{L2}$ and $S_{L3}$. Battery voltage is selectively connected via the high side switches $S_{H1}$ or $S_{H2}$ to motor driver modules 110-1 and 110-2, respectively. The motor driver modules 110 control current output to the motor 66 and sense current flowing to the motor 66 as will be described further below. The motor driver module 110-1 is enabled for a first rotational direction of the motor (such as forward) and the motor driver module 110-2 is enabled for a second or opposite rotational direction of the motor (such as reverse).

Figure 5A:
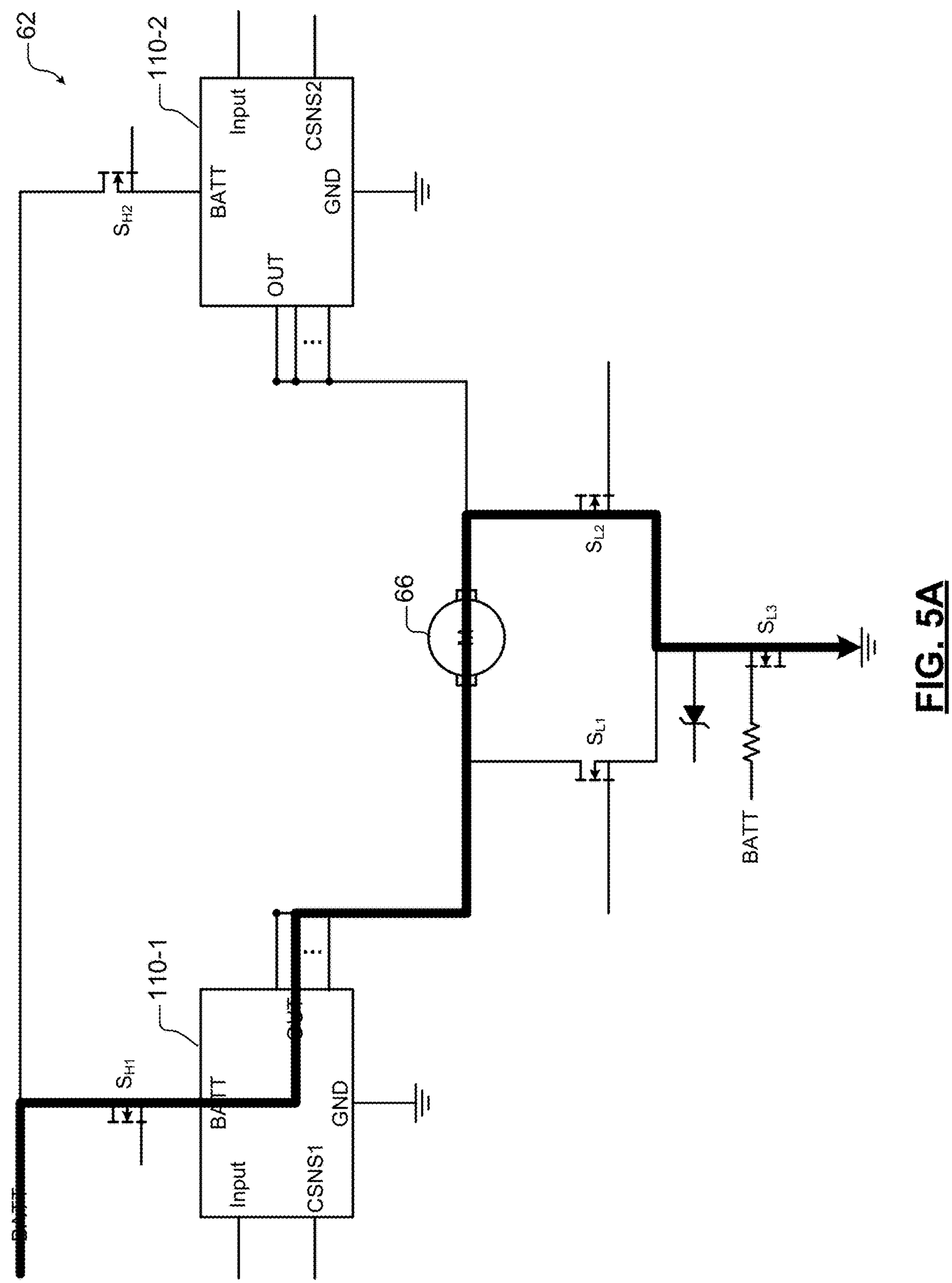
FIGS. 5A-5C illustrate current flow during movement in first and second directions and during a stop phase according to the present disclosure.
Figure 5B:
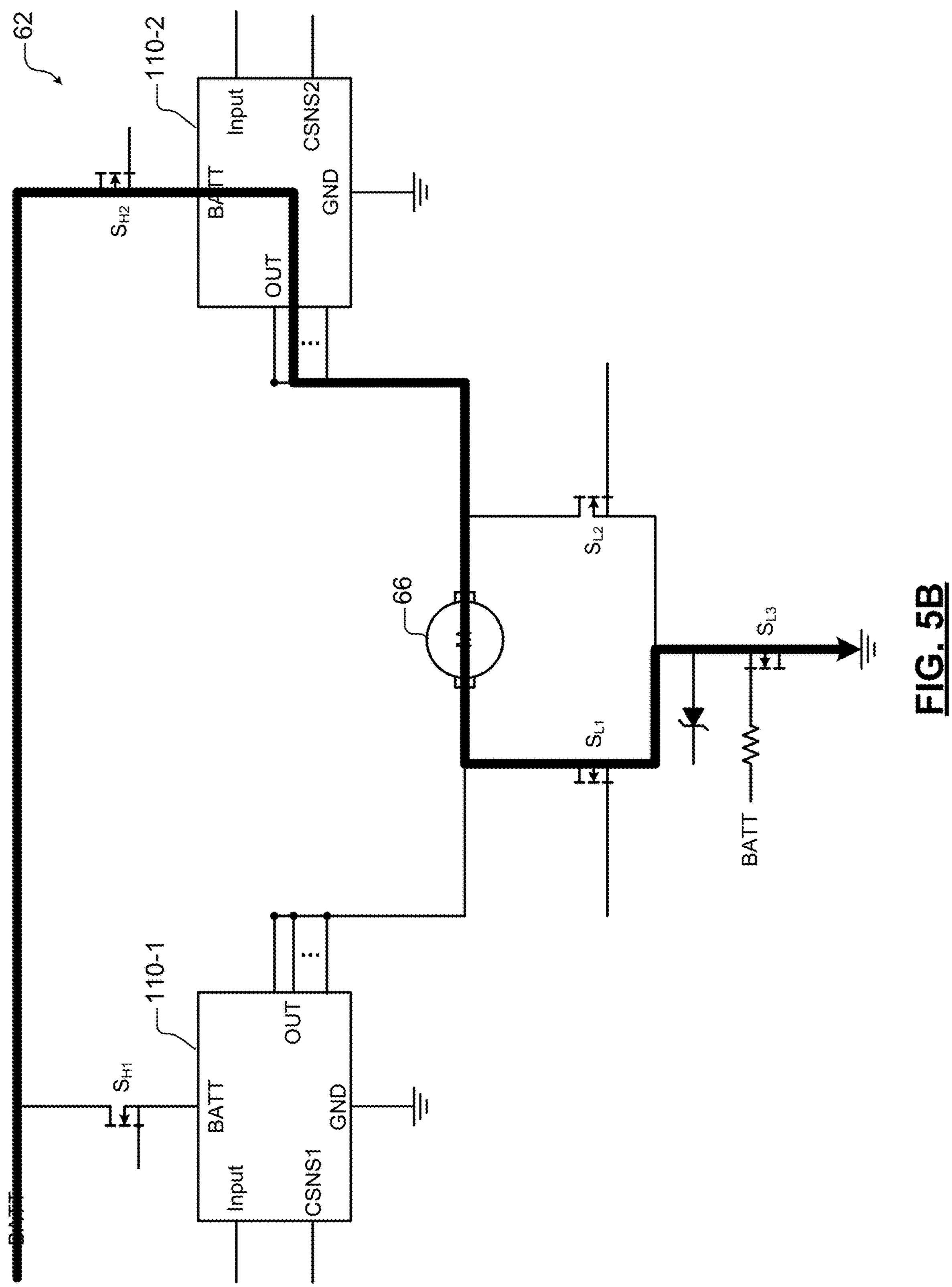

Referring now to FIGS. 5A-5D, an example of current flow and motor switch operation is shown during run phases in the first and second directions and during a stop phase. In FIG. 5A, current flows through the high side switch $S_{H1}$, the motor driver module 110-1, the motor 66 in a first direction, and the low side switches $S_{L2}$ and $S_{L3}$ to ground or another reference potential. In FIG. 5B, current flows through the high side switch $S_{H2}$, the motor driver module 110-2, the motor 66 in a second direction, and the low side switches $S_{L1}$ and $S_{L3}$ to ground or another reference potential.

Figure 5C:
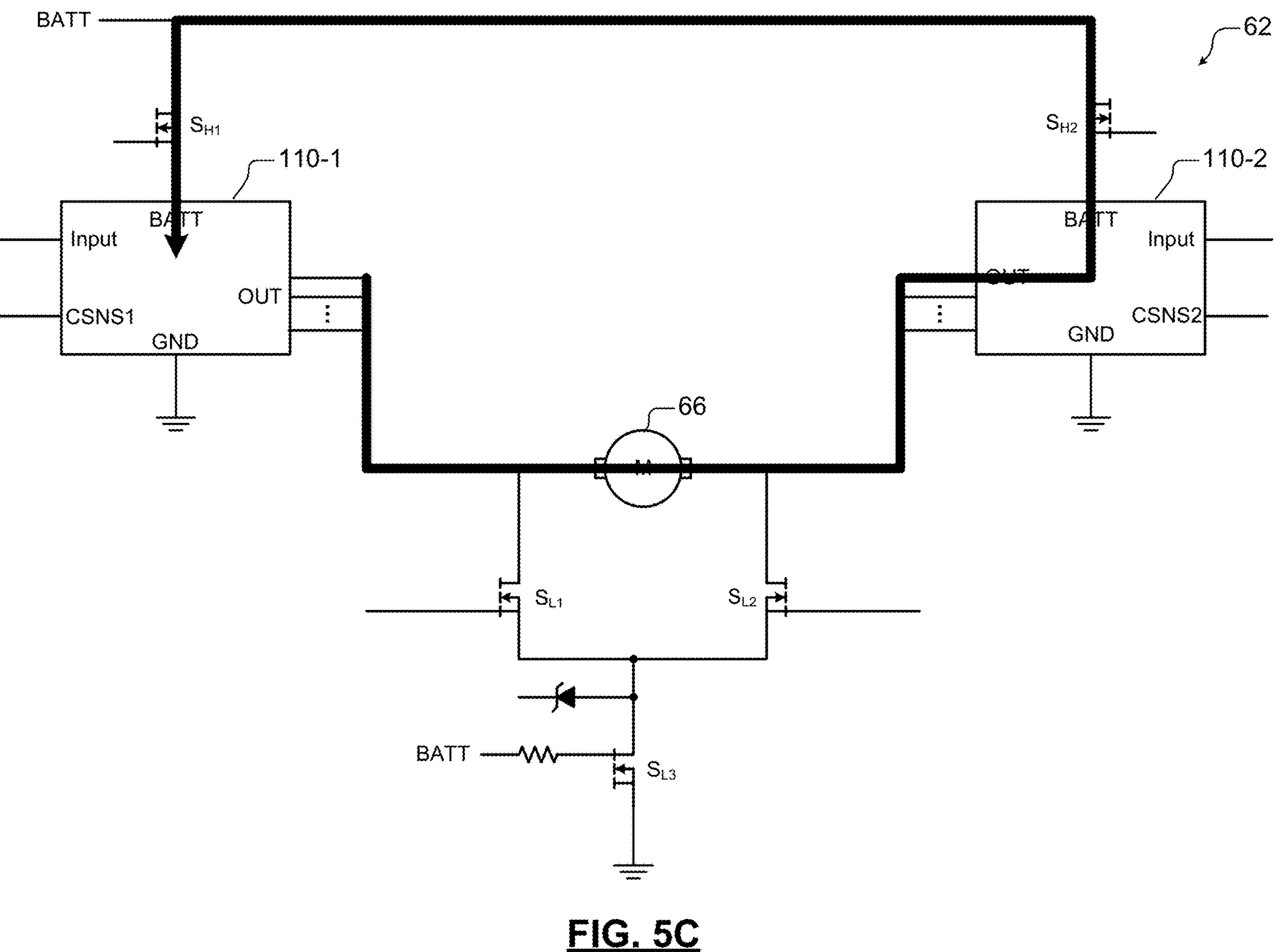
Figure 5D:
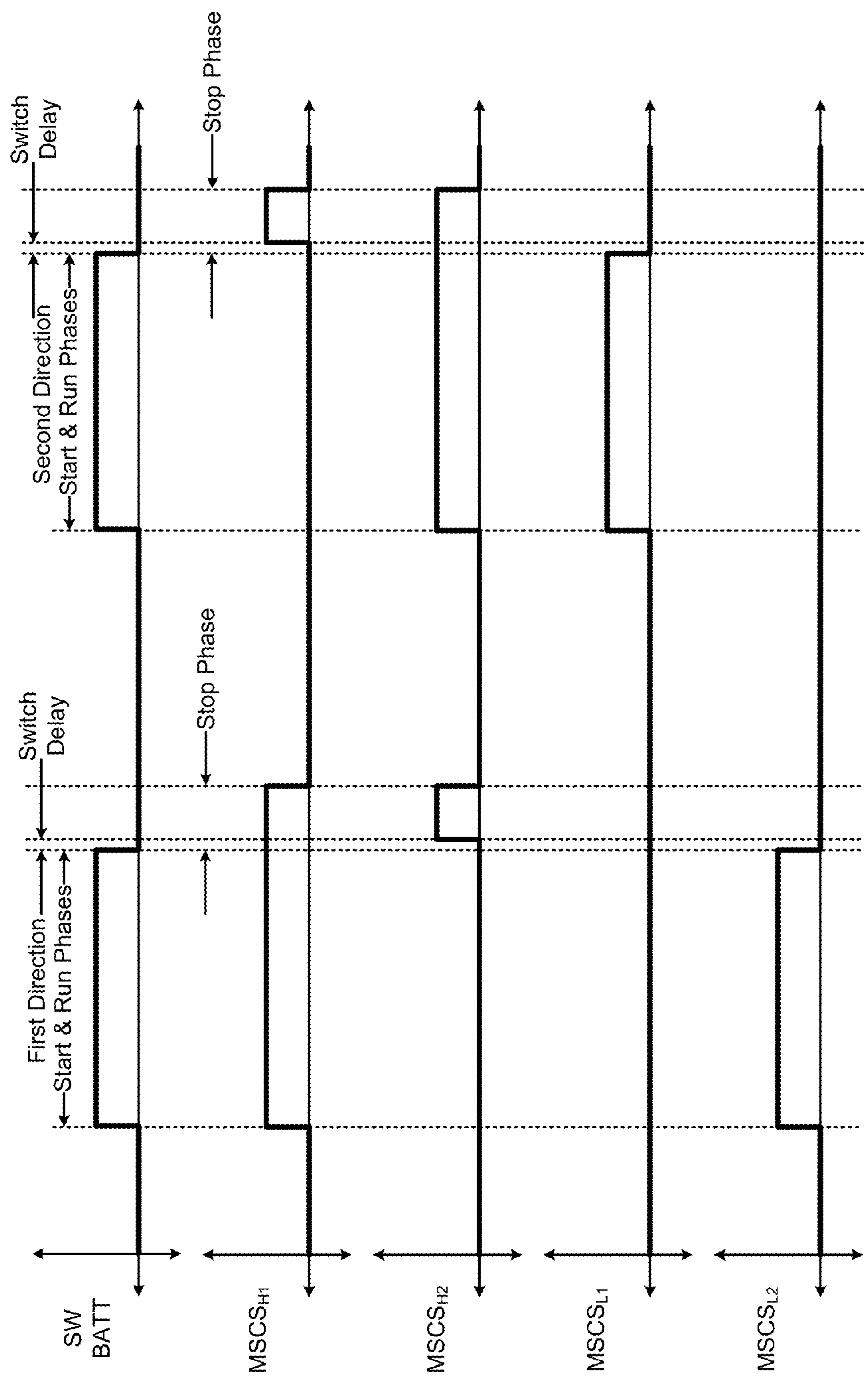
FIG. 5D illustrates an example of control signals for switching the motor switches.

In FIG. 5C, supply current is terminated and the HS and LS switches are configured to measure current induced by the motor 66 during overrun. The motor current is circulated by the HS switches (for example both HS switches are closed) and is measured by one of the motor driver modules 110. In FIG. 5D, a switch delay period may be provided after the run phase (before configuring the HS switches to measure current during the stop phase) to prevent short circuits.

Figure 6A:
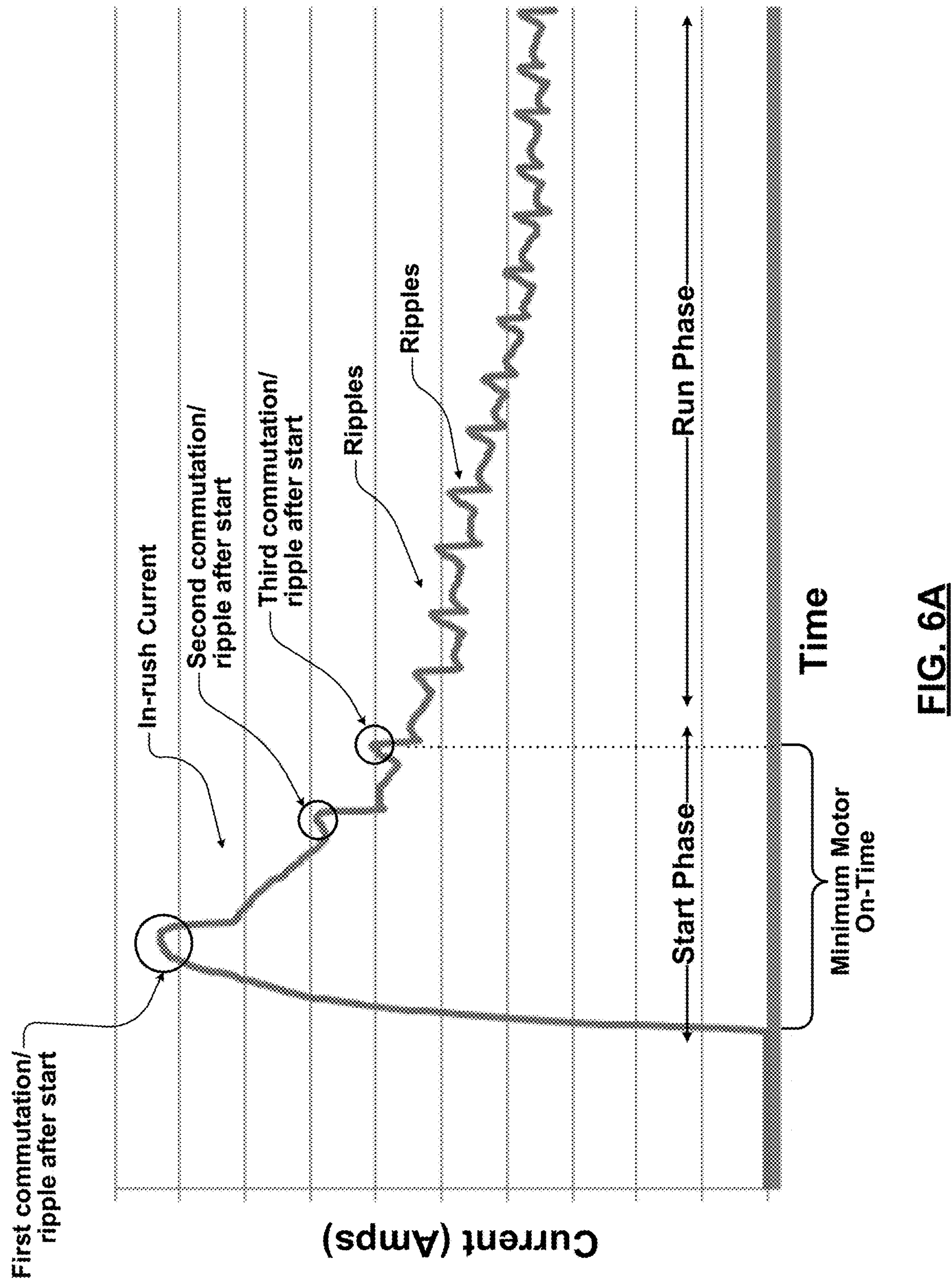
FIG. 6A is a graph illustrating an example of motor current as a function of time during motor start and run phases.
Figure 6B:
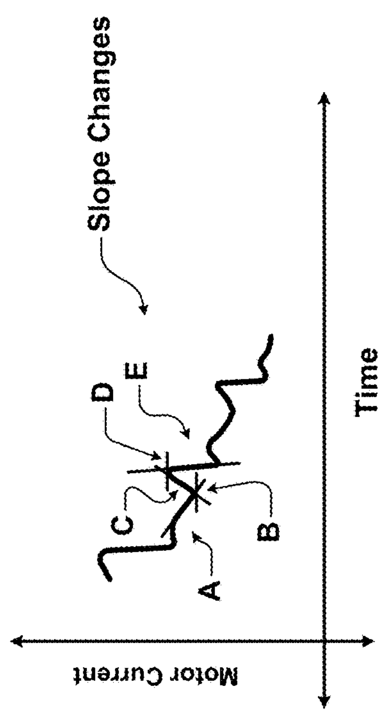
FIG. 6B is a graph illustrating an example of identification of ripples in the motor current.
Figure 6C:
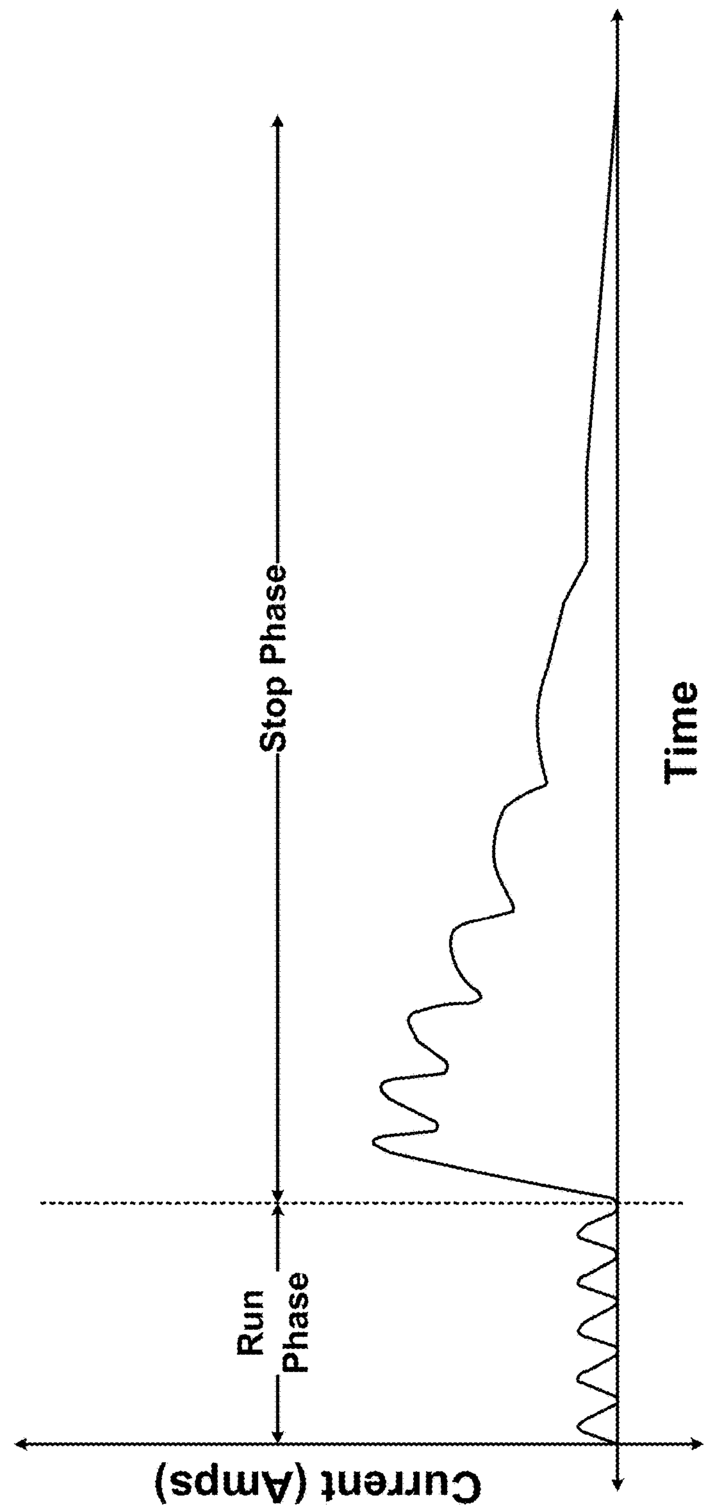
FIG. 6C is a graph illustrating an example of motor current as a function of time during motor run and stop phases.

Referring now to FIGS. 6A-6C, examples of current waveforms during start, run and stop phases is shown. In FIG. 6A, after power is supplied, current increases rapidly (referred to as in-rush current) and the motor begins rotating. Ripples in the current occur during commutation of poles of the motor. The motor position determining module 80 stores a position of the motor when the motor was stopped during the last operation. Then, the position of the motor is used as a starting point during the subsequent start and run phases. The position calculator 82 monitors the current to detect current ripples and adjusts the motor position based on the motor commutations (corresponding to the sensed current ripples) and parameters of a gear train of the motor.

When the motor is started, the motor driver modules 110 may supply power to the motor for a period that is greater than or equal to a minimum motor on-time. The minimum motor on-time may be equal to the current in-rush period discussed below with reference to FIG. 14, and may be determined based on an amplitude of the motor current. Additionally or alternatively, the minimum motor on-time may be determined based on a number of ripples in the motor current. For example, the minimum motor on-time may be set to ensure that the motor continues to operate until at least a minimum number (e.g., 3) of ripples have occurred. The minimum motor on-time may be predetermined based on motor testing and characterization, and stored in memory for retrieval during in-service operation.

In some examples, the ripple current is detected by tracking changes in a slope of the motor current. In the example in FIG. 6B, as the ripples occur, the slope of the current transitions from negative, to zero, to positive, to zero (at the peak) and back to negative. In other examples, changes in the amplitude, average amplitude, peak-to-peak amplitude, etc. can be monitored to detect current ripple. In still other examples, other mathematical functions are used to detect ripples. In FIG. 6C, when power is discontinued after a run phase, the motor continues to rotate due to inertia during a stop phase. The additional rotation (or overrun) needs to be measured to know the correct stop position for future operation of the motor.

Inertia of the motor is estimated based on operating voltage and current at a time that power to the motor is discontinued (and/or during a period just prior to a time that power to the motor is discontinued) and system mass. A resting position of the motor is estimated based on the rotational position at the time that power is discontinued and the estimated inertia. By determining the resting position in the foregoing manner, the motor position determination module 80 accounts for additional rotation of the motor after power is discontinued, and thereby provides a more accurate determination of the resting position.

The resting position is a function of motor speed at a time when power is discontinued and deceleration forces acting on the motor. Deceleration of the motor when power is discontinued is a function of frictional forces generated by the seat movement mechanism including the motor and the gear train (linear decay component), rotational forces generated by magnetic fields in the motor-generator (exponential decay component), and the inertia of the seat assembly. The frictional forces and rotational forces are a function of motor speed (or ripple frequency).

The motor position determination module 80 may determine the resting position of the motor 66 based on the position of the motor 66 when power to the motor 66 is first discontinued and the rotational travel of the motor 66 after power to the motor 66 is discontinued (the motor overrun). In one example, the overrun estimator 88 determines the rotational distance of the motor 66 after power to the motor 66 is discontinued using the following relationship $$RDn=RD(n-1)+RSn*T1, \quad (1)$$

where RDn is the rotational distance of the motor 66 at the current iteration n, RD(n−1) is the rotational distance of the motor 66 at the last iteration n−1, T1 is the period between a first time corresponding to the last iteration n−1 and a second time corresponding to the current iteration n, and RSn is the rotational speed of the motor 66 at the second time.

The speed calculator 83 may determine the rotational speed of the motor 66 at the second time using the following relationship $$RSn=[RSi*e\hat{}(-T2/E)]-(T2/L), \quad (2)$$

where RSn is the rotational speed of the motor 66 at the second time, RSi is the initial rotational speed of the motor 66 when power to the motor 66 is first discontinued, T2 is the period from the time when power to the motor 66 is first discontinued to the second time, E is an exponential decay factor, and L is a linear decay factor. If the rotational speed of the motor 66 is greater than zero, the motor position determination module 80 may increment n, T1, and T2, and once again determine the rotational distance of the motor 66 and the rotational speed of the motor 66 using relationships (1) and (2). If the rotational speed of the motor 66 is equal to zero or within a predetermined range of zero, the motor position determination module 80 may determine the rest position of the motor 66 based on the position of the motor 66 when power to the motor 66 is discontinued and the rotational distance of the motor 66 that was last determined.

The exponential decay factor represents the anti-rotational forces generated by magnetic fields in the motor 66, and the linear decay factor represents the frictional forces generated by the seat movement mechanism of the seat assembly 10. The speed calculator 83 may determine the exponential decay factor based on the voltage supplied to the motor 66 at the time when, or just before, power to the motor 66 is discontinued using, for example, a function (e.g., an equation) or mapping that relates the voltage to the exponential decay factor. The speed calculator 83 may determine the linear decay factor based on a difference between a measured ripple frequency of the motor 66 at a first operating voltage of the motor 66 and a reference ripple frequency of the motor 66 at the first operating voltage. In one example, speed calculator 83 determines the linear decay factor using the following relationship $$L=m*\Delta f+b, \quad (3)$$

where L is the linear decay factor, Δf is the difference between the measured ripple frequency and the reference ripple frequency, and m and b are predetermined constants.

The difference between the measured ripple frequency and the reference ripple frequency indicates, or is an estimate of, the mass of the occupant in the seat assembly 10 and, in combination with the ripple frequency, the inertia of the seat assembly 10. Thus, the inertia estimator 86 may estimate the inertia of the seat assembly 10 based on the difference between the measured ripple frequency and the reference ripple frequency using, for example, a function or mapping that relates the ripple frequency difference to system inertia. The measured ripple frequency is the ripple frequency of the motor 66 measured at the time when power to the motor 66 is first discontinued, or during a period immediately before that time. In one example, the measured ripple frequency is an average value of the ripple frequency of the motor 66 measured during a predetermined period just before power to the motor 66 is discontinued. The first operating voltage is the operating voltage of the motor 66 measured when power to the motor 66 is first discontinued.

The speed calculator 83 may use linear interpolation to determine the reference ripple frequency based on the first operating voltage, a first reference frequency at a minimum operating voltage of the motor 66, and a second reference frequency at a maximum operating voltage. The first reference frequency, the minimum operating voltage, the second reference frequency, and the maximum operating voltage may be predetermined when the motor 66 and the seat assembly 10 are unloaded. In one example, the speed calculator 83 determines the reference ripple frequency using the following relationship $$fref=f1+(V1-V\min)*[(f2-f1)/(V\max-V\min)], \quad (4)$$

where fref is the reference ripple frequency, f1 is the first reference frequency, Vmin is the minimum operating voltage, f2 is the second reference frequency, and Vmax is the maximum operating voltage.

The motor position determination module 80 may use relationships (1), (2), (3), and/or (4) to predict the rotational distance of the motor 66, the rotational speed of the motor 66, the linear decay factor, and/or the reference ripple frequency, respectively, before the motor 66 stops rotating after power to the motor 66 is discontinued. Thus, the motor position determination module 80 may use relationships (1), (2), (3), and/or (4) to predict the resting position of the motor 66 before the motor 66 stops rotating after power to the motor 66 is discontinued. In one example, the motor position determination module 80 may use relationships (1), (2), (3), and/or (4) to predict the resting position of the motor 66 at or before the time when power supply to the motor 66 is discontinued. Thus, the motor position determination module 80 may predict the resting position of the motor 66 before power supply to the motor is discontinued, the target motor stop position module 92 may determine when to discontinue power supply to the motor 66 (e.g., determine the target motor stop position) based on the resting position and a target position, and/or the motor switch controller 94 may discontinue power supply to the motor when the resting position is equal to or within a predetermined range of the target position.

Figure 6D:
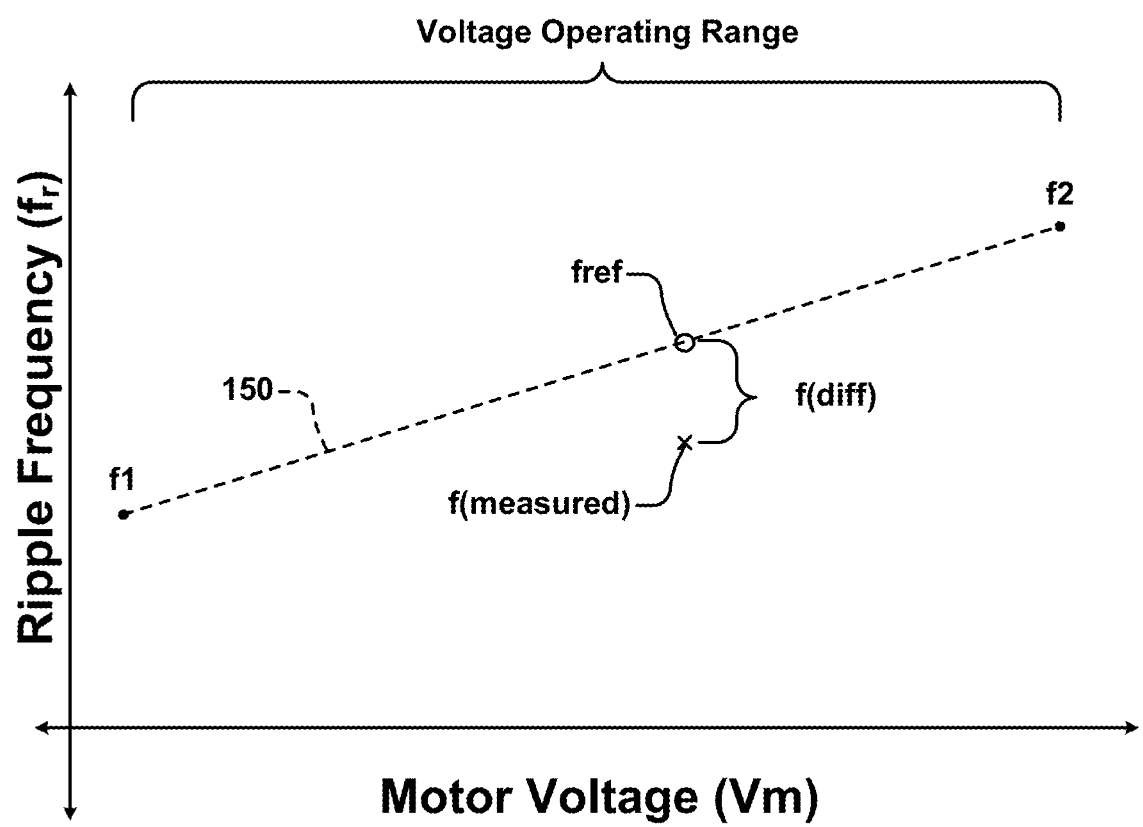
FIG. 6D is a graph illustrating an example of a reference ripple frequency curve over a voltage operating range of the motor according to the present disclosure.

Referring now to FIG. 6D, examples of the reference ripple frequency fref, the first reference frequency f1, the minimum operating voltage Vmin, the second reference frequency f2, and the maximum operating voltage Vmax are illustrated. FIG. 6D also illustrates an example of the measured rippled frequency, which is labelled f(measured), and the difference between the measured ripple frequency and the reference ripple frequency, which is labelled f(diff). The first reference frequency f1 and the minimum operating voltage Vmin correspond to a first point on a reference ripple frequency curve 150, and the second reference frequency f2 and the maximum operating voltage Vmax correspond to a second point on the reference ripple frequency curve 150. The reference frequency curve 150 may be predetermined when the motor 66 and the seat assembly 10 are unloaded by supplying the minimum operating voltage Vmin to the motor 66, supply the maximum operating voltage Vmax to the motor 66, and supplying a plurality of voltages to the motor 66 that are between the minimum and maximum operating voltages Vmin and Vmax. In various examples such as the present example, the reference ripple frequency curve 150 may be linear.

Figure 7:
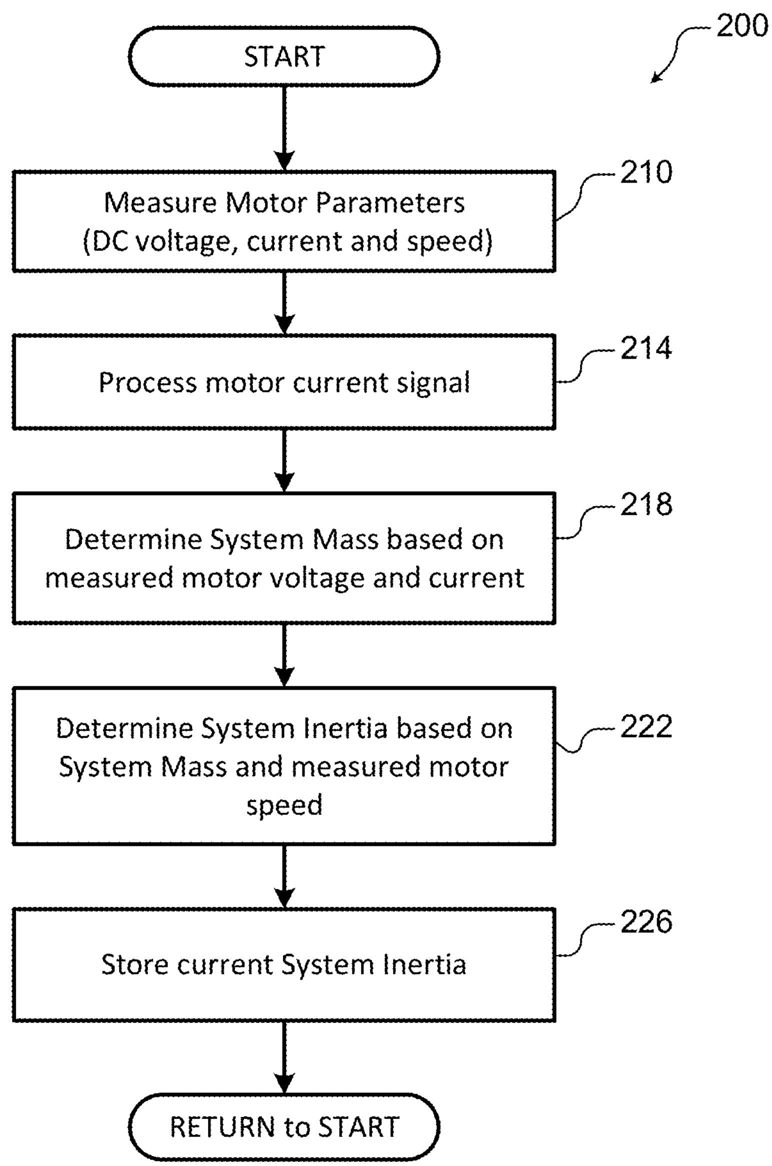
FIG. 7 is a flowchart illustrating an example of a method for measuring inertia according to the present disclosure.

Referring now to FIG. 7, a method 200 for measuring inertia is shown. At 210, motor parameters such as DC voltage, current and/or speed are measured. At 214, the motor current is processed. For example, the ripples in the motor current may be counted to track motor rotation.

At 218, the system mass is determined based on measured motor voltage, current, and/or ripple frequency. In some examples, the system includes the seat assembly alone (if unoccupied) or the seat and an occupant. At 222, system inertia is estimated based on the system mass and the measured motor speed. At 226, the system inertia is stored.

Figure 8:
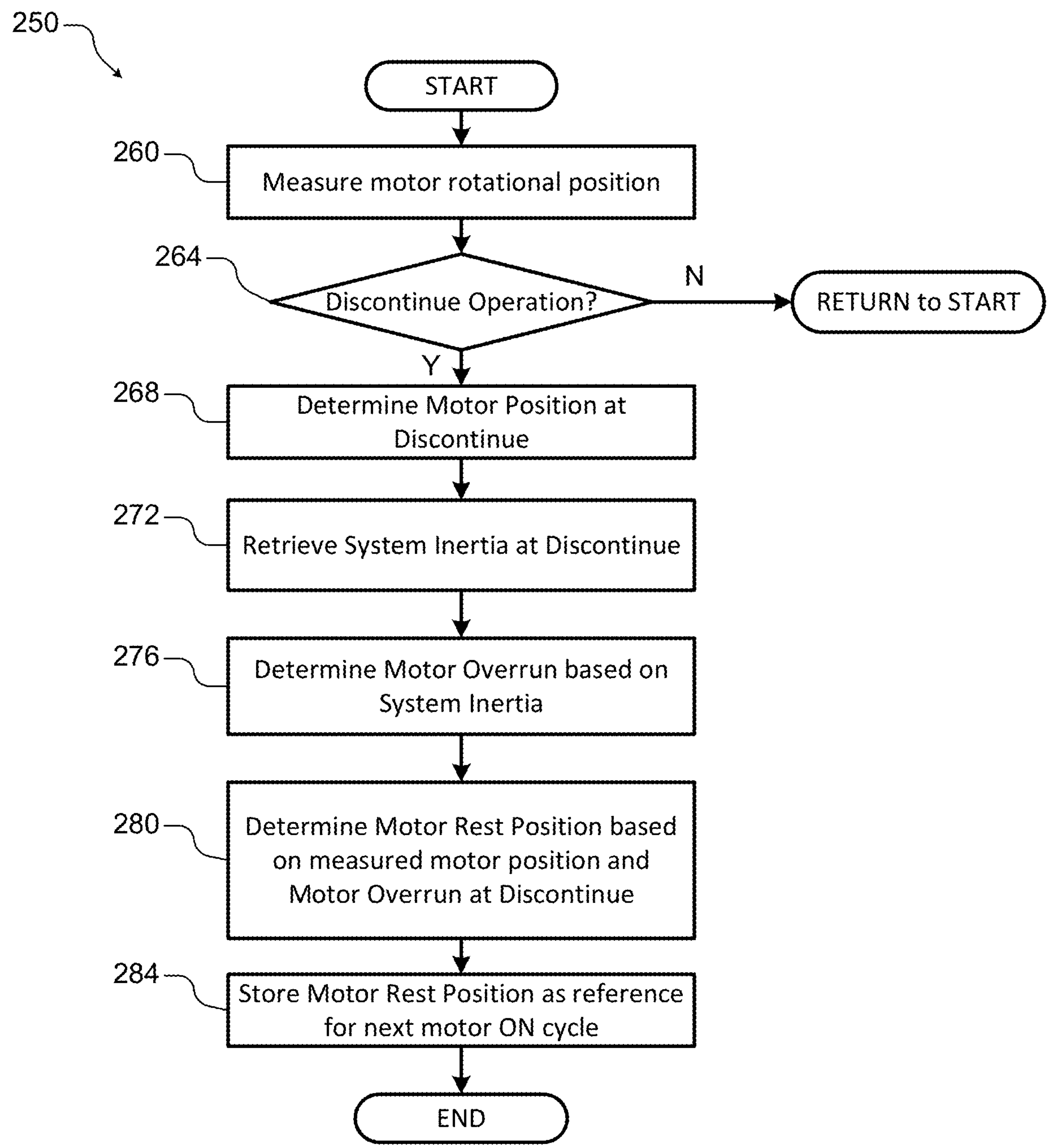
FIG. 8 is a flowchart illustrating an example of a method for determining a motor rest position based on motor overrun due to inertia according to the present disclosure.

Referring now to FIG. 8, a method 250 for determining a motor rest position based on motor overrun is shown. At 260, motor rotational position is measured. At 264, the method determines whether motor operation (such as seat fore/aft tilt, seat assembly movement forward or reverse, etc) is discontinued. If 264 is false, the method restarts. If 264 is true, the motor position is retrieved. The motor position can be determined at the point that the prior operation is discontinued or at the last sample prior to the prior operation being discontinued.

At 272, system inertia when the operation is discontinued is retrieved. At 276, motor overrun is determined based on the system inertia. At 280, a motor rest position is determined based on the measured motor position and the motor overrun after the operation is discontinued. At 284, the motor rest position is stored as a reference for a next motor ON cycle.

The measured motor current signal is processed, and the processed current is used to determine seat system inertia. In one example, the motor current is processed using an infinite impulse response (IIR) filter. A linear speed of the seat system is a function of the motor speed and a gear train that converts rotational movement of motor to linear movement of seat. Seat system inertia is a function of the linear speed of the seat system. Rotational inertia of the motor and the gear train are typically negligible in comparison to the linear inertia of the seat and occupant combination due to a difference in mass. Motor overrun is indicative of rotational movement.

Referring now to FIG. 9A, an in-position band is shown around a target motor position. When moving to the target motor position from one direction (such as forward), the motor inertia and motor direction cause overrun. As a result, to stop the seat within the in-position band around the target motor position, the motor needs to stop prior to (or at the point of) reaching the in-position band. As can be appreciated, motor overrun in the reverse direction may or may not be the same. Therefore, the motor may need to be stopped at the different motor position relative to the in-position band. This effect is called band bias.

The motor position determination module determines an in-position band, determines when the motor is sufficiently close to the in-position band, and discontinues power to the motor in a predetermined manner to cause the motor to stop in a desired resting position in the in-position band.

In FIG. 9B, the target motor stop position module 92 is shown in further detail to include a direction determiner 290 that determines a direction of the motor based on a target position and a current position of the motor. The direction determiner 290 outputs the direction to a band bias selector 294. The band bias selector 294 determines a band bias based on the direction of the motor. An in-position band calculator 292 determines an in-position band based upon the band bias and the inertia. The system mass, the system inertia, the motor speed, and/or the in-position band may be determined at fixed intervals. The intervals may be limited by computational limitations of the stop position module 92 and/or the control loop period. In various implementations, the period between the intervals may be greater than the period between successive ripples in the motor current, and the in-position band may be used to prevent motor overruns of the desired resting position. For example, it may be more advantageous to use the in-position band when the period between the intervals is 20 milliseconds compared to when the period between the intervals is 5 milliseconds. A target motor stop position calculator 296 calculates the target motor stop position based upon the band bias and the in-position band.

Figure 10:
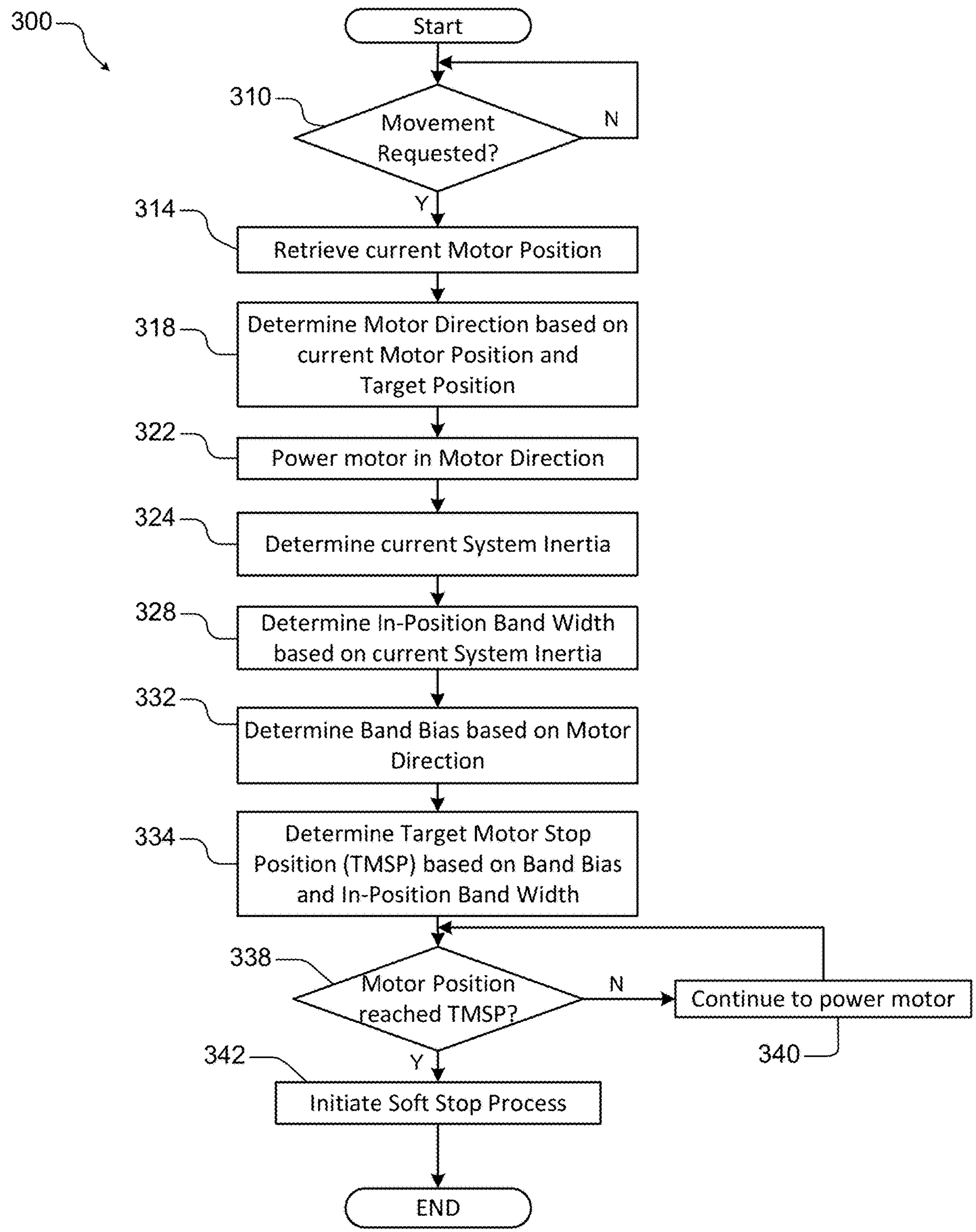
FIG. 10 is a flowchart illustrating an example of a method for determining a target motor stop position according to the present disclosure.

Referring now to FIG. 10, a method 300 for determining a target motor stop position is shown. At 310, the method determines whether a movement request has occurred. When 310 is true, the method retrieves the current motor position at 314. At 318, motor direction is determined based on current motor position and the target position. At 322, the motor is powered in the motor direction. At 324, the current system inertia is determined. At 328, the in-position band width is determined based on the current system inertia. At 332, the band bias is determined based on the motor direction. At 334, a target motor stop position is determined based on the band bias and the in-position band width. At 338, the method determines whether the motor position has reached the target motor stop position. If not, power to the motor is continued at 340. When 338 is true, the method initiates a soft stop process at 342.

A direction of motion may impact the stop position due to mechanical tolerances and inertia. Most accurate positioning may be achieved by initiating a stop prior to a desired stopping point (i.e. prior to or when entering the in-position band). Overrun is a function of inertia so the in-position band changes dynamically based on the calculated inertia.

The target position may be a stored memory seat position or other target position. A position of the in-position band relative to target position may be asymmetrical if the speed of seat movement is different in opposite motor directions for a given seat system mass and motor power. Gear train and other seat system design features may also introduce other asymmetry.

Figure 11A:
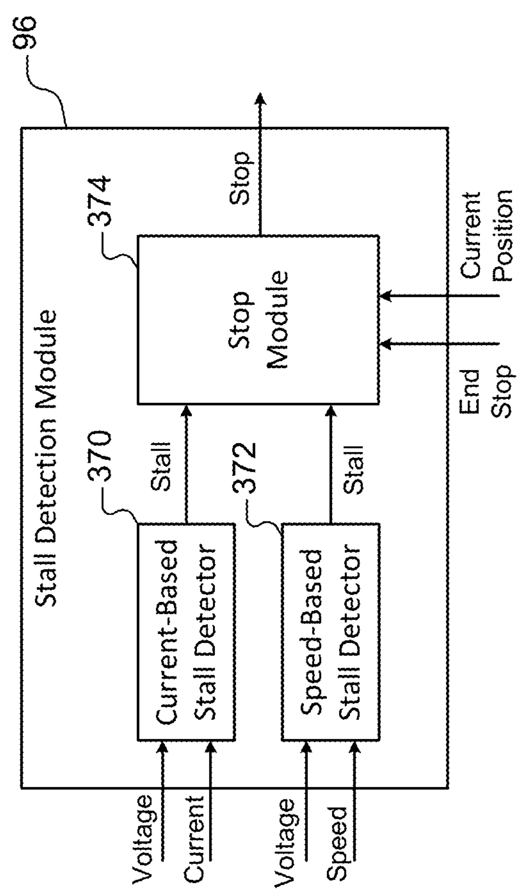
FIGS. 11A-11C are functional block diagrams of various examples of stall detection modules according to the present disclosure.
Figure 11B:
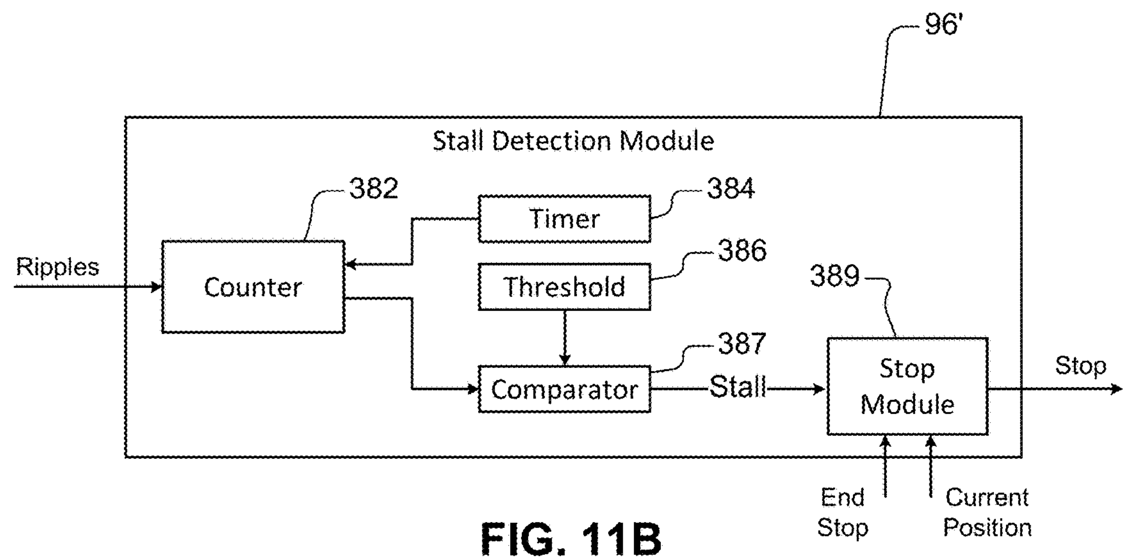
Figure 11C:
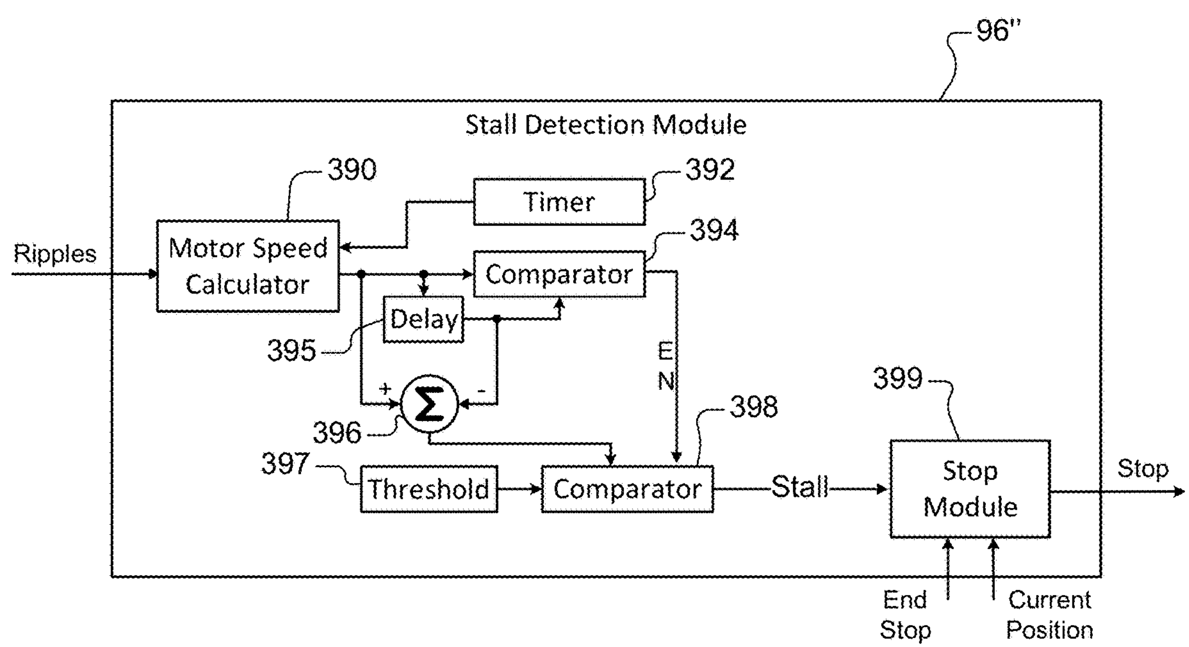

Referring now to FIGS. 11A-11C, various examples of stall detection modules are shown. Power is discontinued when the motor stalls. If the stalling is due to the motor reaching one of the end stop positions (corresponding to maximum travel in the first or second direction), the end stop position is updated. In FIG. 11A, a stall detection module 96 detects a stall condition based upon motor current or motor speed. The stall detection module 96 includes a current-based stall detector 370 and a speed-based stall detector 372. The current-based stall detector 370 monitors voltage and current of the motor and selectively detects a stall condition. In some examples, the stall condition is detected based on a comparison of the motor voltage and current with predetermined motor voltage and current ranges or values.

The speed-based stall detector 372 monitors a voltage of the motor and a speed of the motor and selectively detects a stall condition. In some examples, the stall detection is detected based on a comparison of the voltage and speed of the motor with predetermined motor voltage and speed ranges or values. A stop module 374 receives the stall signals from the current-based stall detector 370 and the speed-based stall detector 372, the current position and the end stop position and generates a stop based thereon.

In FIG. 11B, another stall detection module 96' counts ripples in the motor current and detects stall conditions based upon a ripple count. A counter 382 counts successive ripples during a period determined by a timer at 384. A comparator 387 receives the count after the period and compares the count to a predetermined threshold 386. If the count is less than the predetermined threshold, the comparator 387 detects a stall condition. A stop module 389 receives the stall signals from the comparator 387, the current motor position and the end stop position and generates a stop based thereon.

Referring now to FIG. 11C, another stall detection module 96" is shown to include a motor speed calculator 390 monitors ripples in the motor current and determines a motor speed based thereon. The motor speed calculator 390 periodically outputs the speed to a comparator 394 in response to a period determined by a timer 392. The comparator 394 compares the current speed to a prior speed (output by a delay element 395). If the current speed is less than the prior speed, the comparator 394 enables a second comparator 398. A summer 396 generates a difference between the current speed and the prior speed and outputs the difference to the comparator 398. The comparator 398 compares the difference to a predetermined threshold 397 and identifies a stall condition when the difference is greater than the threshold. A stop module 399 receives the stall signal from the comparator 398, the current position, and the end stop position and identifies a stop based thereon.

Figure 13:
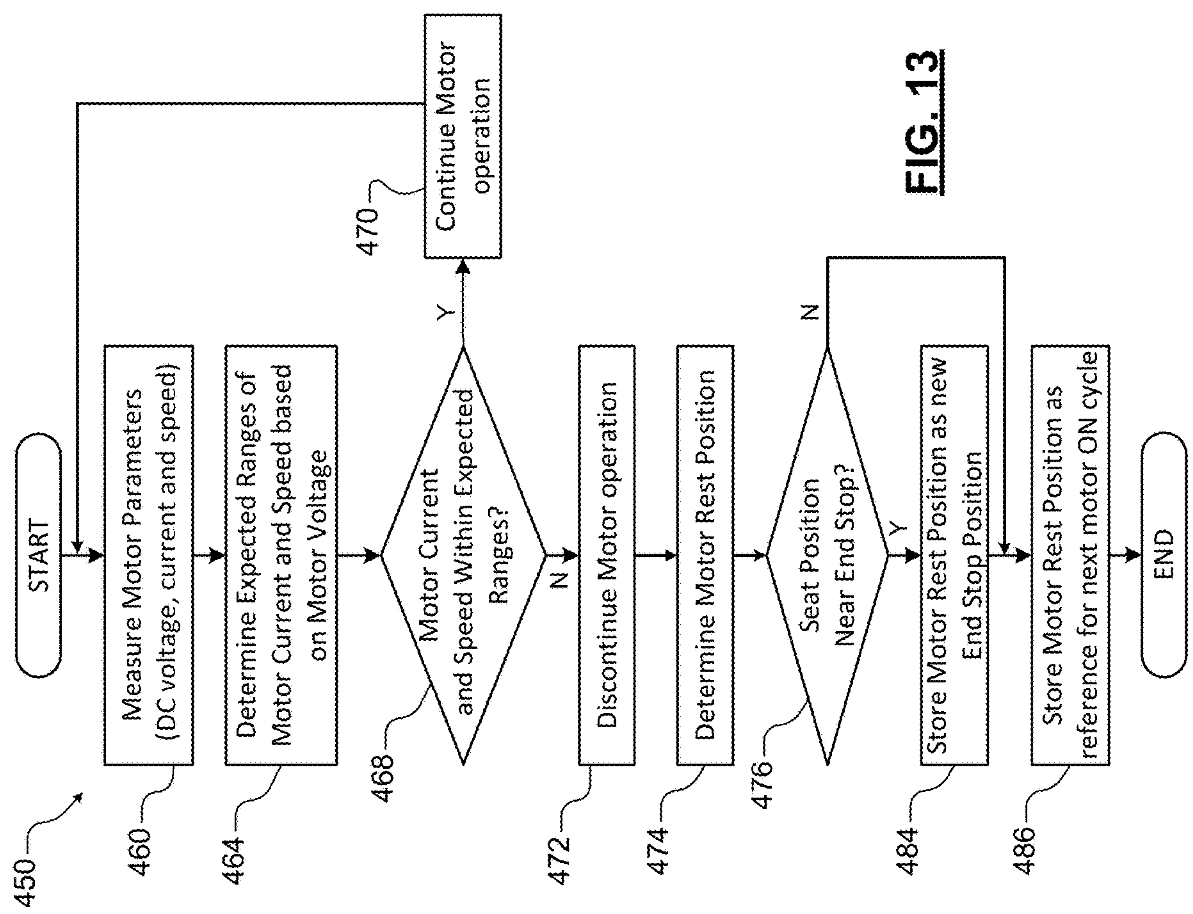
FIGS. 12-13 are flowcharts illustrating an example of a stall detection method according to the present disclosure.
Figure 12:
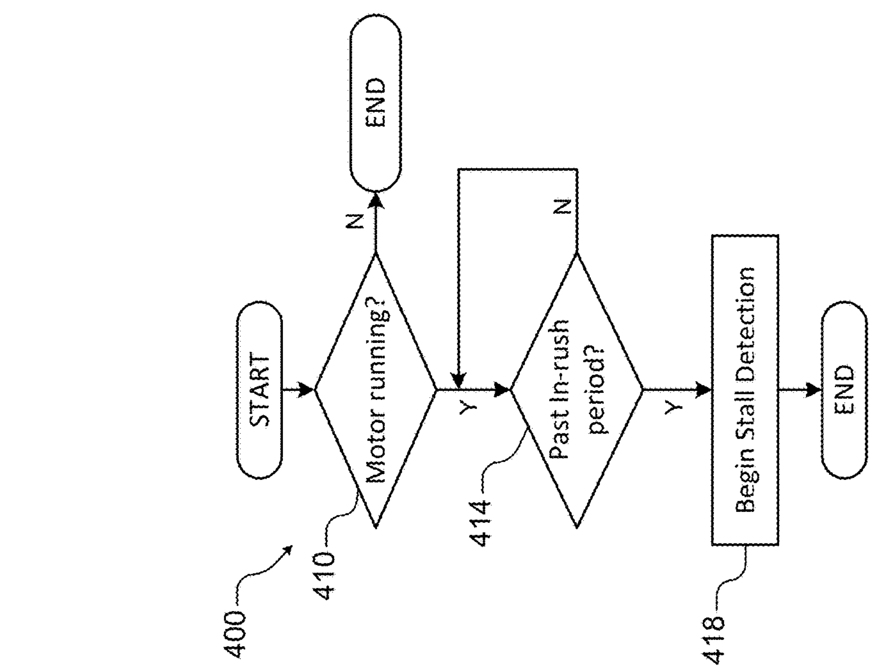

Referring now to FIGS. 12-13, stall detection may be performed after an in-rush current delay period. In FIG. 12, a method 400 is shown. At 410, the method determines whether the motor is running. When the motor is running, the method determines whether the motor is past a period of in-rush current at 414. When the motor is past the in-rush current, stall detection begins at 418. The period may be a fixed period or may be determined by monitoring an amplitude of the motor current.

In FIG. 13, a stall detection method 450 is shown. At 460, motor parameters such as DC voltage, current and speed are measured. At 464, expected ranges of motor current and speed are determined based on the motor voltage. Expected ranges can be predetermined value stored in and retrieved from memory or calculated based on a formula. The expected range for motor current can be determined for a single motor current measurement or a statistical motor current such as a moving average.

At 468, the method determines whether the motor current and speed are within the expected ranges. If 468 is true, motor operation is continued at 470. When 468 is false, the method continues at 472 and discontinues motor operation. The method determines the motor rest position at 474. At 476, the method determines whether the seat position is near an end stop position. The end stop positions correspond to maximum travel positions in the first and second directions.

If 476 is true, the motor rest position is stored as a new end stop position at 484. Method continues from 484 or 476 (if false) with 486 where the motor rest position is stored as a reference for a next motor ON cycle.

Figure 14B:
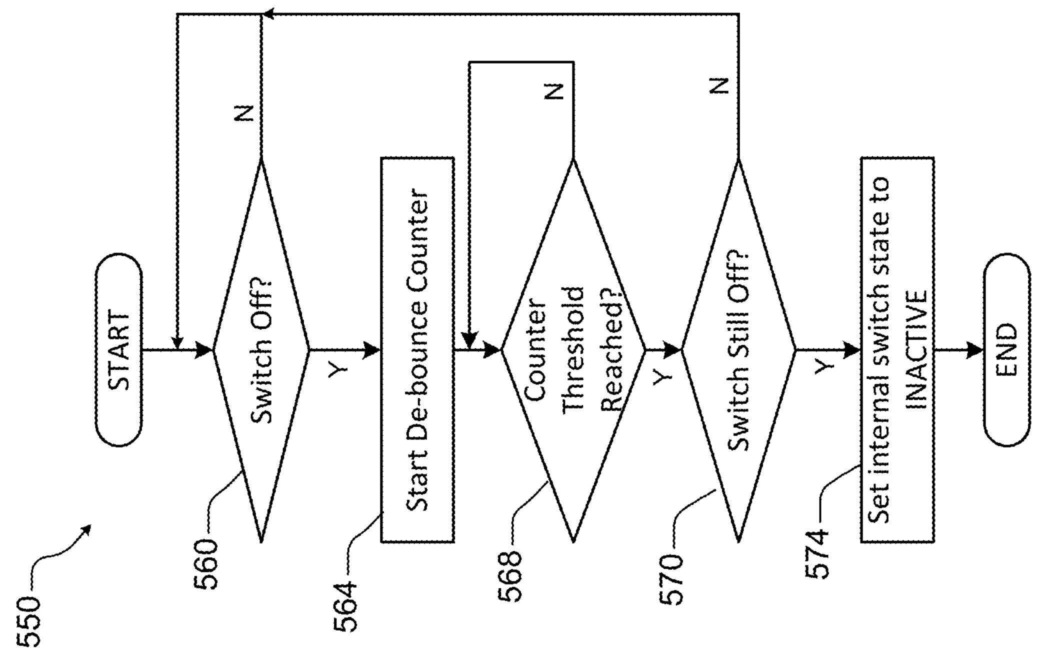
FIGS. 14A, 14B and 15 are flowcharts illustrating a switch de-bounce method according to the present disclosure.
Figure 14A:
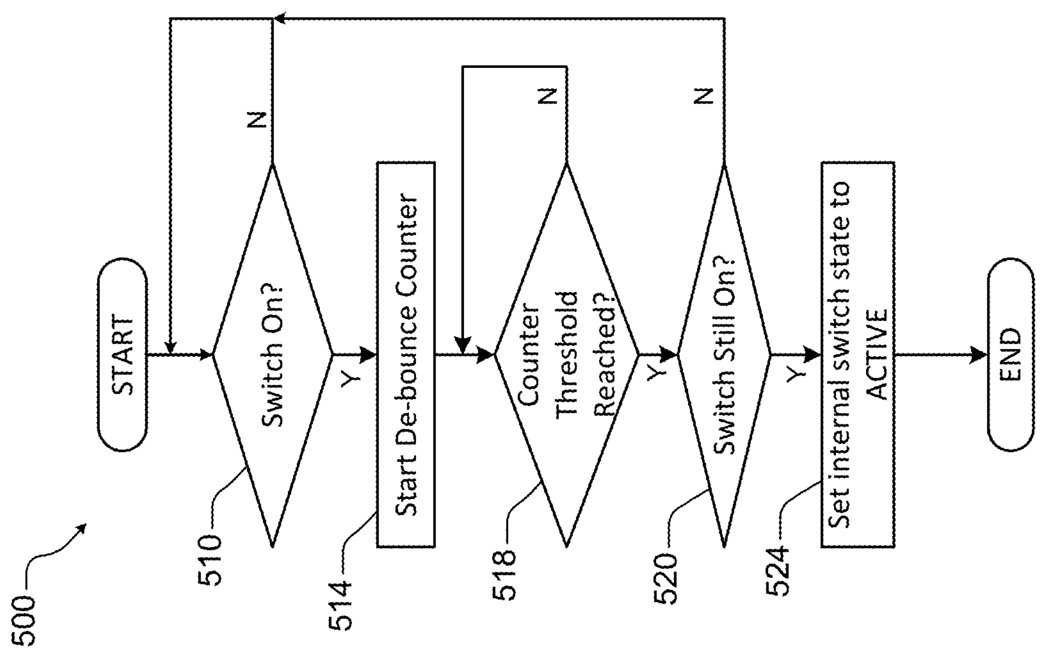
Figure 15:
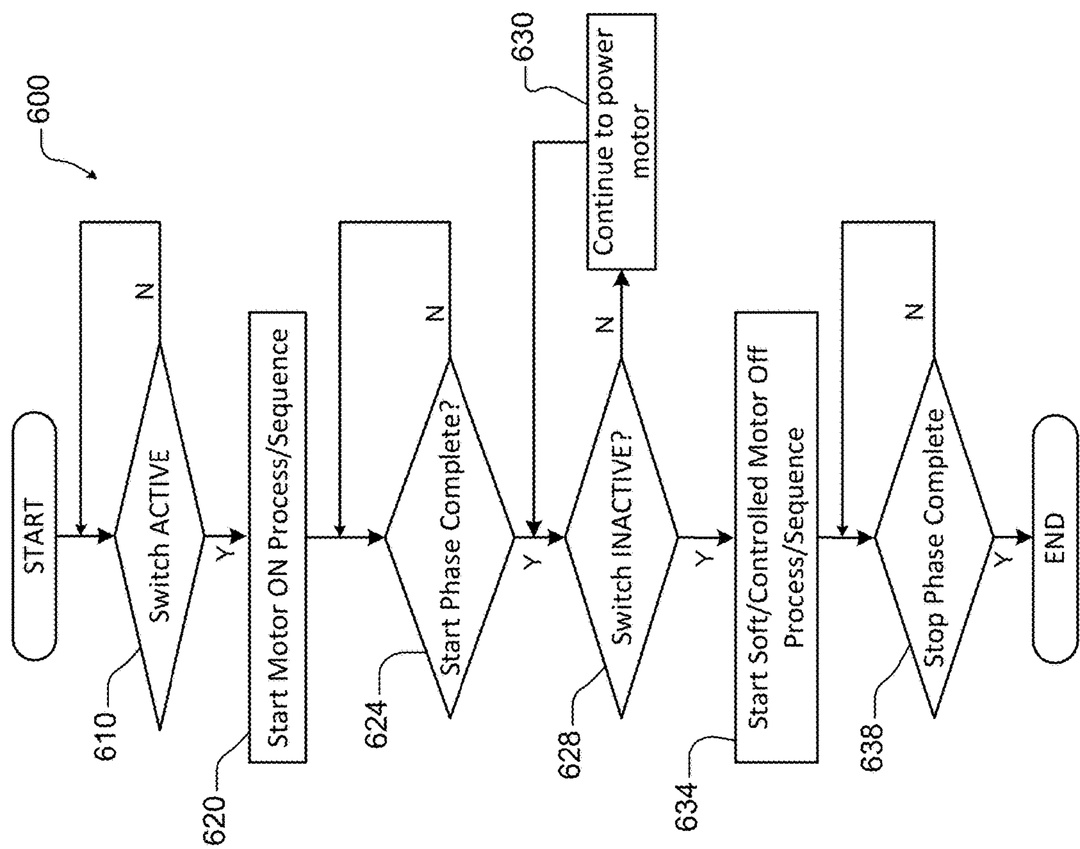

Referring now to FIGS. 14A, 14B and 15, a switch de-bounce method performed by the switch state monitoring module 106 and the switch de-bounce module 108 are shown. In FIG. 14A, a method 500 for detecting switch bounce when the switch is turned ON is shown. At 510, the method determines whether the switch is ON. When 510 is true, the method continues at 514 and starts a de-bounce ON counter. At 518, the method determines whether the counter threshold is reached. When the de-bounce ON counter threshold is reached at 518, the method determines whether the switch is still ON at 520. If the switch is not still ON at 520, the method returns to 510. When 520 is true, the method sets the switch state to ACTIVE at 524. This method prevents errors due to intermittent switch operation.

In FIG. 14B, a method 550 for detecting switch bounce when the switch is turned OFF is shown. At 560, the method determines whether the switch is OFF. When 560 is true, the method continues at 564 and starts a de-bounce OFF counter. At 568, the method determines whether the counter threshold is reached. When the de-bounce counter threshold is reached at 568, the method determines whether the switch is still OFF at 570. If the switch is not still OFF at 570, the method returns to 560. When 570 is true, the method sets the switch state to INACTIVE at 564. This method prevents errors due to intermittent switch operation.

Referring now to FIG. 15, a method 600 for controlling the motor based on the ACTIVE and INACTIVE switch states determined by the de-bounce methods in FIGS. 14A and 14B are shown. At 610, the method determines whether the switch is in the ACTIVE state. If 610 is true, the method starts the motor ON process/sequence at 620. If the start phase is not complete as determined at 624, the method returns to 624. When 624 is true, the method determines whether the switch is in the INACTIVE state at 628. If 628 is false, power continues to be supplied to the motor at 630 and the method returns to 628. When 628 is true, the method performs a soft stop/controlled motor off process/sequence at 634. At 638, the method determines whether the stop phase is complete. When 638 is true, the method ends.

Figure 16:
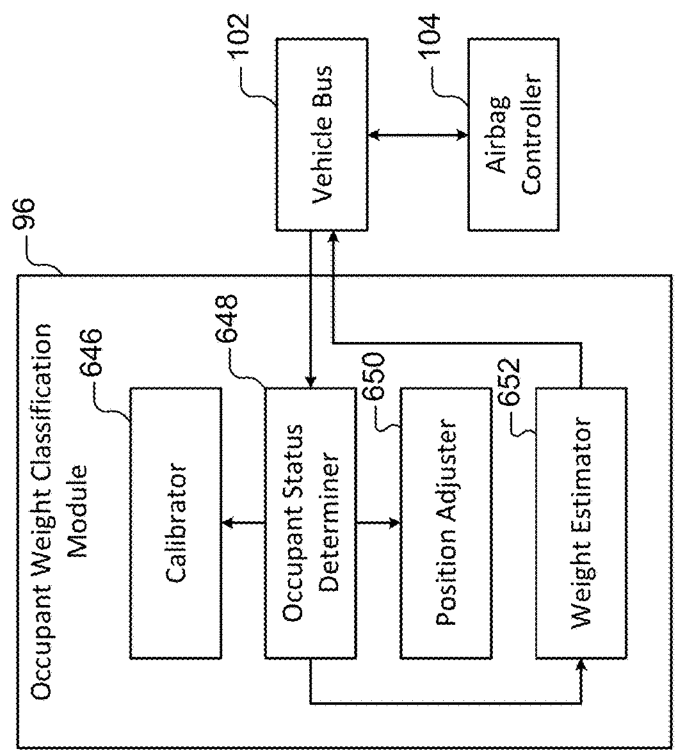
FIG. 16 is a functional block diagram of an example of an occupant weight classification module according to the present disclosure.

Referring now to FIG. 16, the occupant weight classification module 96 is shown in further detail to include a calibrator 646, an occupant status determiner 648, a motor position adjuster 650 and a weight estimator 652. The calibrator 646 calibrates a weight of the seat assembly during an unloaded condition of the seat assembly by adjusting a position of the seat, measuring motor torque and/or motor ripple frequency during movement and estimating weight based on the motor torque and/or the motor ripple frequency.

The occupant status determiner 648 determines when an occupant enters the vehicle after calibration has occurred. Data received from the vehicle bus such as door lock/unlock events or door opening/closing events may be used to determine occupant status. The occupant status determiner 648 may determine whether the seat is loaded based on one or more inputs associated with an occupant's departure, such as an input from at least one of a seat belt latch sensor associated with seat belt latch of the seat, a door latch sensor associated with a door for an occupant of the seat, and a camera operable to generate an image of the seat. In one example, the occupant status determiner 648 determine that the seat is unoccupied when a signal generated by the seat belt latch sensor transitions from indicating that the seat belt buckle is latched to indicating that the seat belt buckle is unlatched. In another example, the occupant status determiner 648 determine that the seat is unoccupied when a signal generated by the door latch sensor transitions from indicating that the door is latched to indicating that the door is unlatched, and then indicates that the door is latched again. In another example, the occupant status determiner 648 determines that the seat is unoccupied when a signal generated by the camera indicates that an occupant of the seat is no longer present in the seat.

The motor position adjuster 650 adjusts a position of the seat and the weight estimator 652 measures motor torque and/or motor ripple frequency and estimates occupant weight during movement of the seat. In various examples, the weight estimator 652 estimates the occupant weight based on a difference between a measured ripple frequency f(measured) and a reference ripple frequency f(diff), as discussed above. The weight estimator 652 outputs the weight or weight classification via the vehicle bus 102 to the airbag controller 104. The airbag controller 104 may enable or disable the airbags based on the weight classification.

Figure 17:
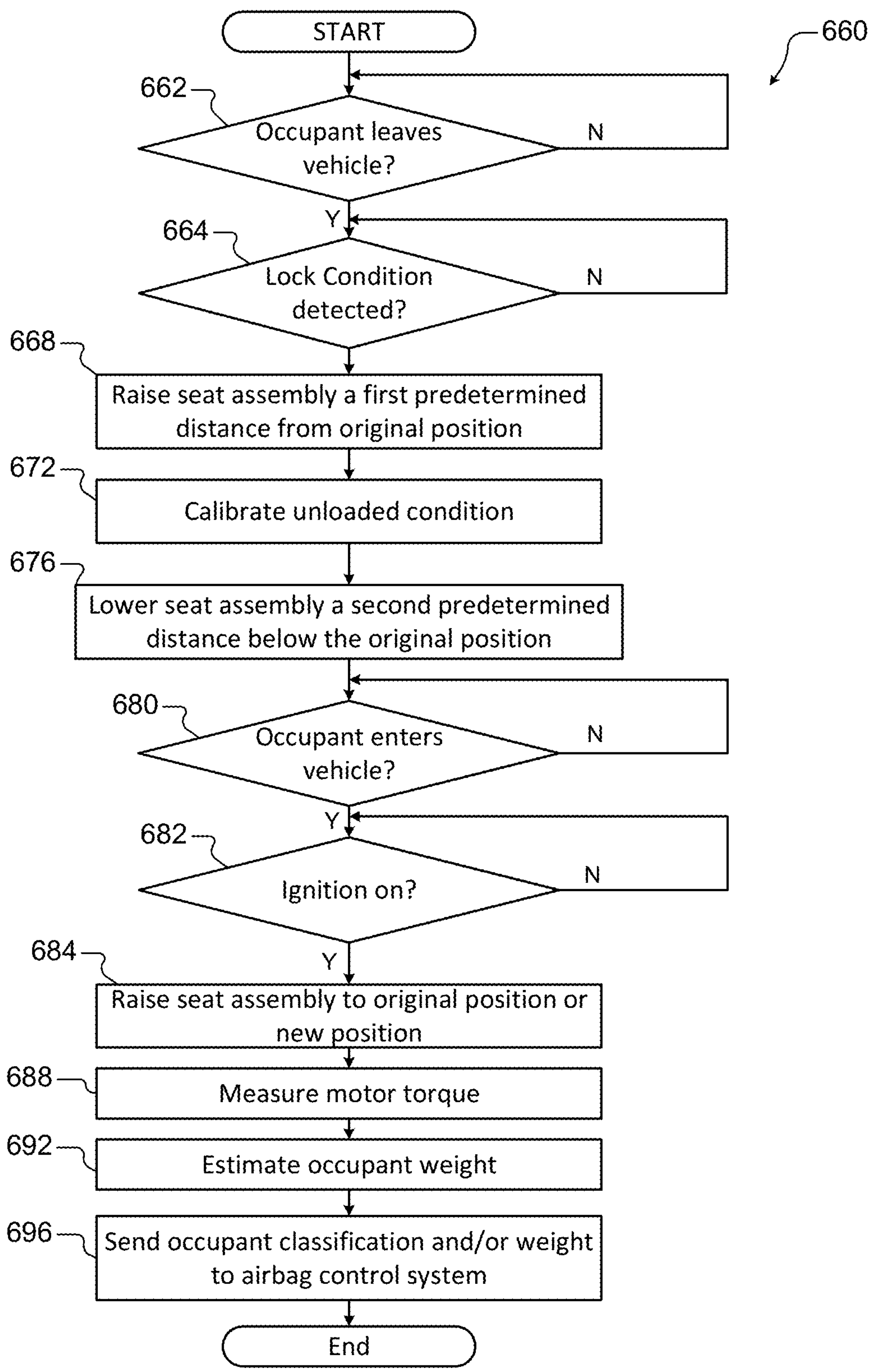
FIG. 17 is a flowchart illustrating an example of a method for determining an occupant weight classification according to the present disclosure.

Referring now to FIG. 17, a method 660 for determining an occupant weight classification is shown. At 662, the method determines whether the occupant has left the vehicle. When 662 is true, the method determines whether a lock condition is detected at 664. At 668, the seat assembly is raised to a first predetermined distance from an original position. Alternatively, the seat assembly may be raised for a first predetermined period. At 672, an unloaded condition of the seat assembly is calibrated to determine a weight of the seat assembly. For example, the weight estimator 652 may measure a first motor torque and/or a first motor ripple frequency as the seat is moved by the first predetermined distance or for the first predetermined period.

At 676, the seat assembly is lowered to a second predetermined distance below an original position. The second predetermined distance may be equal to or different than the first distance. If the seat assembly is fully lowered, the seat may be raised from the original position and then lowered back to the original position. At 680, the method determines whether the occupant enters the vehicle. When 680 is true, the method continues at 682 and determines whether the ignition is turned on. When 682 is true, the method raises the seat assembly to the original position or a new position (for example when the occupant selects a recall button associated with a different seat position). Alternatively, the method may raise the seat assembly for a second predetermined period. The second predetermined period may be equal to or different than the first predetermined period. At 688, the weight estimator 652 measures a second motor torque and/or a second motor ripple frequency as the seat is moved by the second predetermined distance or for the second predetermined period. At 692, the weight estimator 652 estimates the occupant weight. In one example, the weight estimator 652 estimates the occupant weight based on a difference between the first and second motor ripple frequencies using, for example, a function or mapping that relates ripple frequency differences to occupant weight.

In some examples, the weight corresponding to the sum of the occupant and the seat assembly is estimated and then the calibrated weight of the seat assembly is subtracted. At 696, the occupant classification and/or weight is transmitted to an airbag control system. The airbag control system may calibrate the airbag system and/or determine whether or not to enable the airbag system based on the occupant classification and/or weight.

The motor position determination system described herein allows the reliable use of seat position memory recall with high precision and without the use of costly Hall Effect sensors and associated wiring. Reduced wiring allows for added feature content or reduced footprint. The approach accommodates a wide range of motors and can be calibrated and used with any automotive brushed DC motors and motor suppliers. Multiple motors can be operated simultaneously during memory recall.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:

a motor control module configured to:

supply power to a motor to move a seat in a first direction from a first position to a second position when the seat is unoccupied; and supply power to the motor to move the seat in a second direction from a third position to a fourth position when an occupant is in the seat; and an occupant weight classification module configured to:

measure a first frequency of ripples in current supplied to the motor as the seat is moved from the first position to the second position;

measure a second frequency of ripples in the current supplied to the motor as the seat is moved from the third position to the fourth position; and determine a weight of the occupant based on the first and second frequencies.

2. The system of claim 1 wherein a first distance between the first and second positions is equal to a second distance between the third and fourth positions.

3. The system of claim 1 wherein the second direction is the same as the first direction.

4. The system of claim 1 wherein:

the third position is the same as the first position; and the fourth position is the same as the second position.

5. The system of claim 1 wherein:

the third position is the same as the second position; and the fourth position is the same as the first position.

6. The system of claim 1 wherein the occupant weight classification module is configured to determine whether the seat is occupied based on an input from at least one of a seat belt latch sensor, a door latch sensor, and a camera operable to generate an image of the seat.

7. The system of claim 1 wherein the occupant weight classification module is configured to determine the weight of the occupant based on a difference between the first and second frequencies.

8. The system of claim 1 wherein the first and second directions are vertical directions.

9. The system of claim 1 wherein the first direction is a downward direction and the second direction is an upward direction.

10. The system of claim 1 wherein the occupant weight classification module is configured to:

determine a weight of the seat based on the first frequency;

determine a total weight of the seat and the occupant based on the second frequency; and determine the weight of the occupant by subtracting the weight of the seat from the total weight of the seat and the occupant.

11. A system comprising:

a motor control module configured to:

supply power to a motor to move a seat in a first direction for a first period when the seat is unloaded; and supply power to the motor to move the seat in a second direction for a second period when an occupant is in the seat; and an occupant weight classification module configured to:

measure a first number of ripples in current supplied to the motor during the first period;

measure a second number of ripples in the current supplied to the motor during the second period; and determine a weight of the occupant based on the first number of ripples and the second number of ripples.

12. The system of claim 11 wherein the second period is equal to the first period.

13. The system of claim 11 wherein the second direction is the same as the first direction.

14. The system of claim 11 wherein the occupant weight classification module is configured to determine whether the seat is occupied based on an input from at least one of a seat belt latch sensor, a door latch sensor, and a camera operable to generate an image of the seat.

15. A system comprising:

a motor control module configured to:

supply power to a motor to move a seat in a first direction for a first period when the seat is unloaded; and supply power to the motor to move the seat in a second direction for a second period when an occupant is in the seat; and an occupant weight classification module configured to:

measure a first frequency of ripples in current supplied to the motor during the first period;

measure a second frequency of ripples in the current supplied to the motor during the second period; and determine a weight of the occupant based on the first and second frequencies.

16. The system of claim 15 wherein the second period is equal to the first period.

17. The system of claim 15 wherein the occupant weight classification module is configured to determine the weight of the occupant based on a difference between the first and second frequencies.

18. The system of claim 15 wherein the first and second directions are vertical directions.

19. The system of claim 15 wherein the first direction is a downward direction and the second direction is an upward direction.

20. The system of claim 15 wherein the occupant weight classification module is configured to:

determine a weight of the seat based on the first frequency;

determine a total weight of the seat and the occupant based on the second frequency; and determine the weight of the occupant by subtracting the weight of the seat from the total weight of the seat and the occupant.

* * * * *